United States Patent
Cai et al.

(10) Patent No.: US 10,927,272 B2
(45) Date of Patent: Feb. 23, 2021

(54) LATEX POLYMERIZATION USING A COMBINATION OF REACTIVE SURFACTANTS FOR TRAFFIC MARKINGS

(71) Applicant: Ennis Paint, Inc., Thomasville, NC (US)

(72) Inventors: Jiali Cai, High Point, NC (US); Haibo Li, High Point, NC (US); Kevin Newell, Thomasville, NC (US); Jeremy Cheek, Winston Salem, NC (US); Robert W. Greer, Lexington, NC (US)

(*) Notice: Subject to any disclaimer, the term of this patent is extended or adjusted under 35 U.S.C. 154(b) by 0 days.

(21) Appl. No.: 14/876,421

(22) Filed: Oct. 6, 2015

(65) Prior Publication Data
US 2016/0108274 A1 Apr. 21, 2016

Related U.S. Application Data

(60) Provisional application No. 62/060,303, filed on Oct. 6, 2014.

(51) Int. Cl.
*C09D 113/02* (2006.01)
*C08K 3/22* (2006.01)

(52) U.S. Cl.
CPC .............. *C09D 113/02* (2013.01); *C08K 3/22* (2013.01); *C08K 2003/2241* (2013.01)

(58) Field of Classification Search
CPC .......... C09D 113/02; C08K 3/22; C08K 5/06; C08K 5/41; C08K 5/52; C08K 5/5205
USPC ....................................................... 524/833
See application file for complete search history.

(56) References Cited

U.S. PATENT DOCUMENTS

| | | |
|---|---|---|
| 4,814,514 A | 3/1989 | Yakota et al. |
| 5,324,862 A | 6/1994 | Yakota et al. |
| 7,906,571 B2 | 3/2011 | Bloom et al. |
| 9,051,341 B2 | 6/2015 | Palmer, Jr. |
| 2013/0047892 A1 | 2/2013 | Palmer, Jr. |
| 2013/0280434 A1 | 10/2013 | Graf et al. |
| 2014/0114006 A1 | 4/2014 | Palmer, Jr. |

FOREIGN PATENT DOCUMENTS

| | | |
|---|---|---|
| JP | 2002301353 | 10/2002 |
| WO | 20140146049 A2 | 9/2014 |

OTHER PUBLICATIONS

Palmer, Charles F. Jr; New Reactive Surfactants for Emulsion Polymerization, Part 1. PCI Magazine, Jan. 10, 2012 [online] [retrieved Jul. 11, 2014] retrieved from internet: http://www.pcimag.com/articles/96937-new-reactive-surfactants-for-emulsion=-polymerization-part-1 (Whole document).
Guyot, A. and Tauer, K.; "Reactive Surfactants in Emulsion Polymerization". Advances in Polymer Science, vol. III, Springer-Verlag, Berlin, pp. 43-65.
El-Asser, M. et al.; "Advances in Emulsion Polymerization for Coating Applications: Latex Blends and Reactive Surfactants". Journal of Coating Technology, Sep. 2001. pp. 51-63. vol. 73, No. 920.
Palmer, Jr, Charles, "New Reactive Surfactants for Emulsion Polymerization, Part 1". Oct. 1, 2012. http://www.pcimag.com/articles.

*Primary Examiner* — Edward J Cain
(74) *Attorney, Agent, or Firm* — Kilpatrick Townsend & Stockton LLP

(57) ABSTRACT

The present disclosure provides latex compositions manufactured using a combination of reactive surfactants. The compositions are useful as road marking materials.

19 Claims, 12 Drawing Sheets

406

LATEX POLYMERIZATION USING A COMBINATION OF REACTIVE SURFACTANTS FOR TRAFFIC MARKINGS

PRIORITY

This application claims benefit of and priority to U.S. Provisional Patent Application No. 62/060,303 filed on Oct. 6, 2014, the entirety of which is incorporated herein.

FIELD OF INVENTION

The present invention relates to the emulsion polymerization of ethylenically unsaturated monomers for use as flexible fast-dry traffic paints that exhibit early water paint wash-off resistance with no curl, limited dirt pickup, and acceptable scrub resistance. This disclosure further relates to emulsion polymerization of ethylenically unsaturated monomers by using combinations of lower concentrations (preferably 1.0 wt % and 1.0 wt %) of styrenated reactive surfactants containing multiple allyl glycidyl ether linkages as the primary emulsifiers. The disclosure also relates to a process for the preparation of a polymer dispersion obtained by free radical polymerization of an aqueous monomer emulsion utilizing thermal and/or redox initiation. The method for production includes waterborne polymer and copolymer dispersions comprising monomer units derived from at least one polymerizable ethylenically unsaturated monomer. The polymer and copolymer dispersions are obtained from a free radical emulsion polymerization process performed in an aqueous media and in the presence of at least two styrenated surfactant containing multiple allyl glycidyl ether linkages. In a further aspect, the disclosure refers to the use of polymer or copolymer dispersions.

BACKGROUND OF THE INVENTION

Emulsion polymerization is an industrial method for manufacture of aqueous dispersion polymers. Emulsion polymerization is typically performed in an aqueous medium in the presence of a surfactant and a water-soluble initiator and usually rapidly produces high molecular weight homo or copolymers at high solids content and low dispersion viscosity. The polymerization requires the emulsification of the monomer in a medium, usually water, through the use of emulsifiers. These are supplied in addition to the other additives that go into most polymerizations, such as the initiator and chain transfer agents. The use and type of emulsifier determines many of the characteristics of the produced polymer or copolymer, which is typically a latex (a stable colloidal suspension of polymer particles in a continuous phase, usually water).

Moreover, the emulsifier usually cannot be completely removed from the latex. For this reason, and because of the great unpredictability of the efficacy of a given surface-active agent as an emulsifier during polymerization, many compounds that would theoretically be useful are not.

It is also known that emulsion polymerization requires the use of a surfactant to form a stable emulsion of monomers and to prevent coagulation of the product polymer. Surfactants are generally categorized into two types: either non-polymerizable or polymerizable (co-polymerizable with the monomers for polymer formation). Surfactants are also categorized as anionic, cationic, non-ionic or zwitterionic depending on their chemical makeup. A problem which has arisen with the use of non-polymerizable surfactants is that they remain (as residue) in the final product polymer and because they are easily extracted by water, they make the product sensitive to water.

"Emulsion polymerization" is a misnomer that arises from a historical misconception. Rather than occurring in emulsion droplets, polymerization takes place in the latex particles that form spontaneously in the first few minutes of the process. These latex particles are typically 100 nm in size, and are made of many individual polymer chains. The particles do not coagulate with each other because each particle is surrounded by the surfactant ('soap'); the charge on the surfactant repels other particles electrostatically. When water-soluble polymers are used as stabilizers instead of soap, the repulsion between particles arises because these water-soluble polymers form a 'hairy layer' around a particle that repels other particles. Pushing particles together involves compressing these polymers chains.

Emulsion polymerization is used to manufacture several commercially important polymers. Many of these polymers are used as solid materials and must be isolated from the aqueous dispersion after polymerization. In other cases the dispersion itself is the end product. A dispersion resulting from emulsion polymerization is often called a latex (especially if derived from a synthetic rubber) or an emulsion (even though "emulsion" strictly speaking refers to a dispersion of an immiscible liquid in water). These emulsions have applications in many industrial applications including adhesives, paints, paper coating and textile coatings. They are finding increasing acceptance and are preferred over solvent-based products as a result of their eco-friendly characteristics due to the absence of VOCs (Volatile Organic Compounds).

Advantages of emulsion polymerization include:
  High molecular weight polymers can be made at fast polymerization rates. By contrast, in bulk and solution free radical polymerization, there is a tradeoff between molecular weight and polymerization rate.
  The continuous water phase is an excellent conductor of heat and allows the heat to be removed from the system, allowing for many reaction methods that can provide for reaction rate increases.
  Since polymer molecules are contained within the particles, the viscosity of the reaction medium remains close to that of water and is not dependent on molecular weight.
  The final product can be used as is and does not generally need to be altered or processed.

The resulting latex is typically used in coating applications such as paints, stains, etc. Once the latex-containing product has been applied to a surface as part of a protective or decorative coating, the surfactant is no longer needed. In fact, the presence of the surfactant often depresses the moisture sensitivity of the coating. Other coating properties such as adhesion to the substrate surface can be negatively affected as well. This is largely due to the mobility of the surfactant polymers. For example, locally high concentrations of surfactant molecules can form in the coating from the coalescence of surfactant-coated micelle spheres. When the coating is exposed to water, these unbound surfactant molecules can be extracted from the coating leaving thin spots or pathways to the substrate surface. This can result in a pin-holing effect and attack of the substrate by water.

Reactive surfactants contain a polymerizable moiety that can participate in free-radical emulsion polymerization reactions. When used in an emulsion polymerization a large fraction of the surfactant molecules become irreversibly bound to the emulsion polymer chains and droplets. When the latex is then incorporated into a paint for coating, there is much less free surfactant to interfere with the desired coating properties or to reduce adhesion to the substrate.

A number of reactive nonionic and anionic surfactants are commercially available. Surfactants useful in the present invention are both polymerizable surfactants and polymerizable/non-polymerizable nonionic surfactants. Polymerizable anionic surfactants include, but not limited to, distyrenated phenyl polyoxyethylene monoallyl(dially, triallyl) ether sulfates, phosphates, polyoxyethylene allyl phenyl ether sulfates and sulfonates, polyoxyethylene ally ether sulfates and sulfonates, sodium mono-2-(methacryloyloxy) ethyl succinate, monosodium ethylsulfonate monododecyl maleate, sodium 3-allyloxy-2-hydroxyl-1-propane-sulfonates, and mixtures thereof. Polymerizable nonionic surfactants include for example; distyrenated phenyl polyoxyethylenemonoallyl(dially, triallyl) ether, polyoxyethylene allyl phenyl ether, polyethylene glycol2,4,6-tris(1-phenyl (ethyl) phenyl ether methacrylate, Allyl methoxy trithylene glycol ether, polyethylene glycol monoallyl ether, and mixtures thereof. Nonpolymerizable nonionic surfactants include for example, octyl phenol ethoxylate, alkyl ethylene oxide/propylene oxide copolymers, and distyrenate phenyl polyoxyethylene ether (Ethox-703). Nonpolymerizable anionic surfactants, such as distyrenate phenyl polyoxyethylene ether sulfate ammonium (Ethox-704), are also available.

Additionally, anionic reactive surfactants have been disclosed in Japanese Patent Publication No. 46-12472, Japanese Kokai Patent Publication No. 54-144317, Japanese Patent Publication No. 46-34894, Japanese Patent Publication No. 56-29657, Japanese Kokai Patent Publication No. 51-30285, U.S. Pat. Nos. 4,814,514, 5,324,862, and U.S Patent Application Publications 2013/0047892 and 2014/0114006, among others. A review of reactive surfactants may be found in "Reactive Surfactants in Emulsion Polymerization" Guyot, A. and Tauer, K., in *Advances in Polymer Science*, Vol III, Springer-Verlag, Berlin, pp 43-65.

None of these reactive surfactants incorporate more than one reactive moiety in their structure. The styrenated phenol-based materials disclosed in U.S. Pat. No. 4,814,514 prepared by the addition of allyl glycidyl ether (AGE) to surfactant based molecules such as hydroxyl-functional fatty alcohols or substituted phenols specifically limit the amount of AGE to 1.0 mole.

SUMMARY OF THE INVENTION

Figure 1:
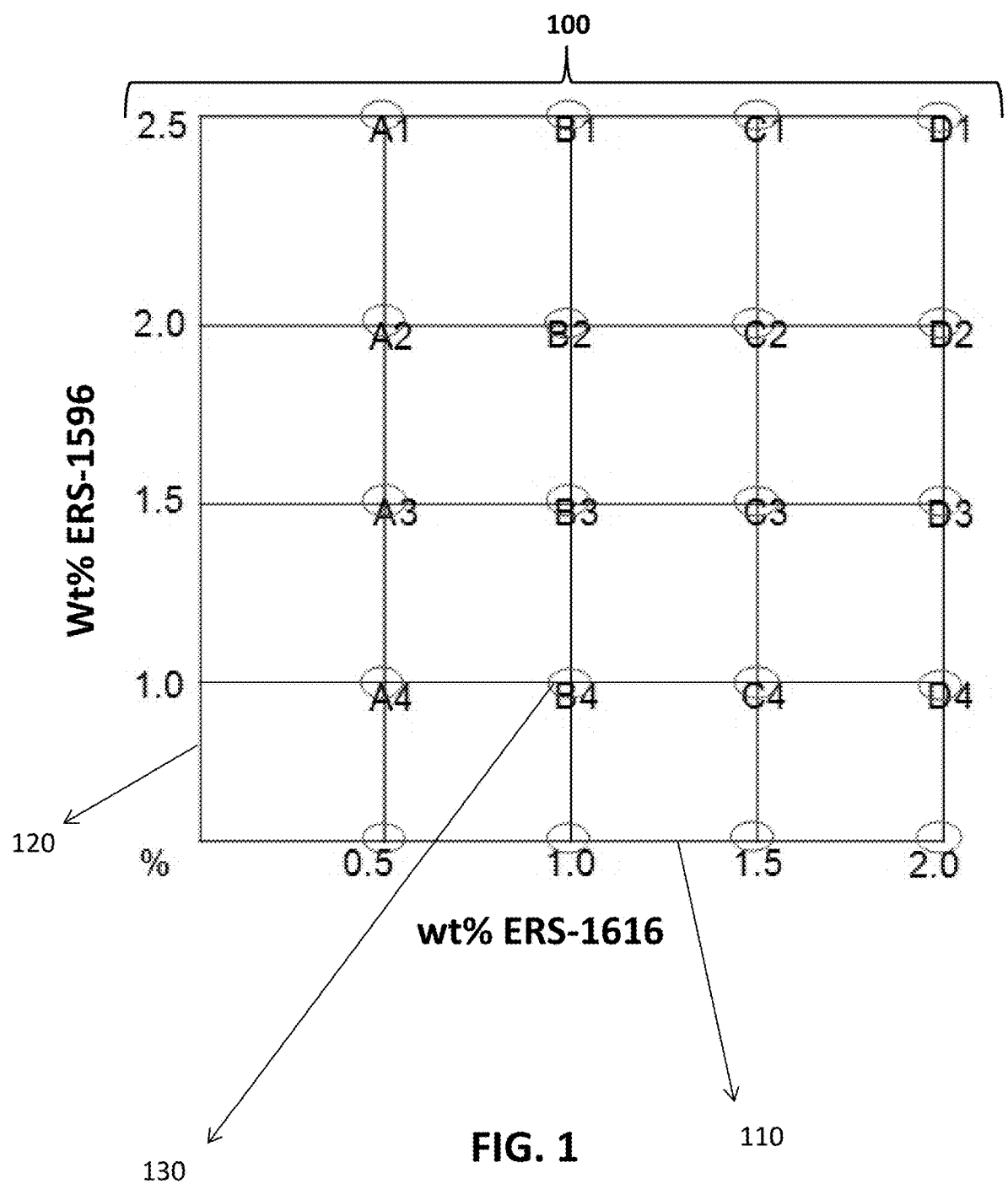
FIG. 1 provides the reactive surfactant combination composition matrix of the latex of the present disclosure.
Figure 2A:
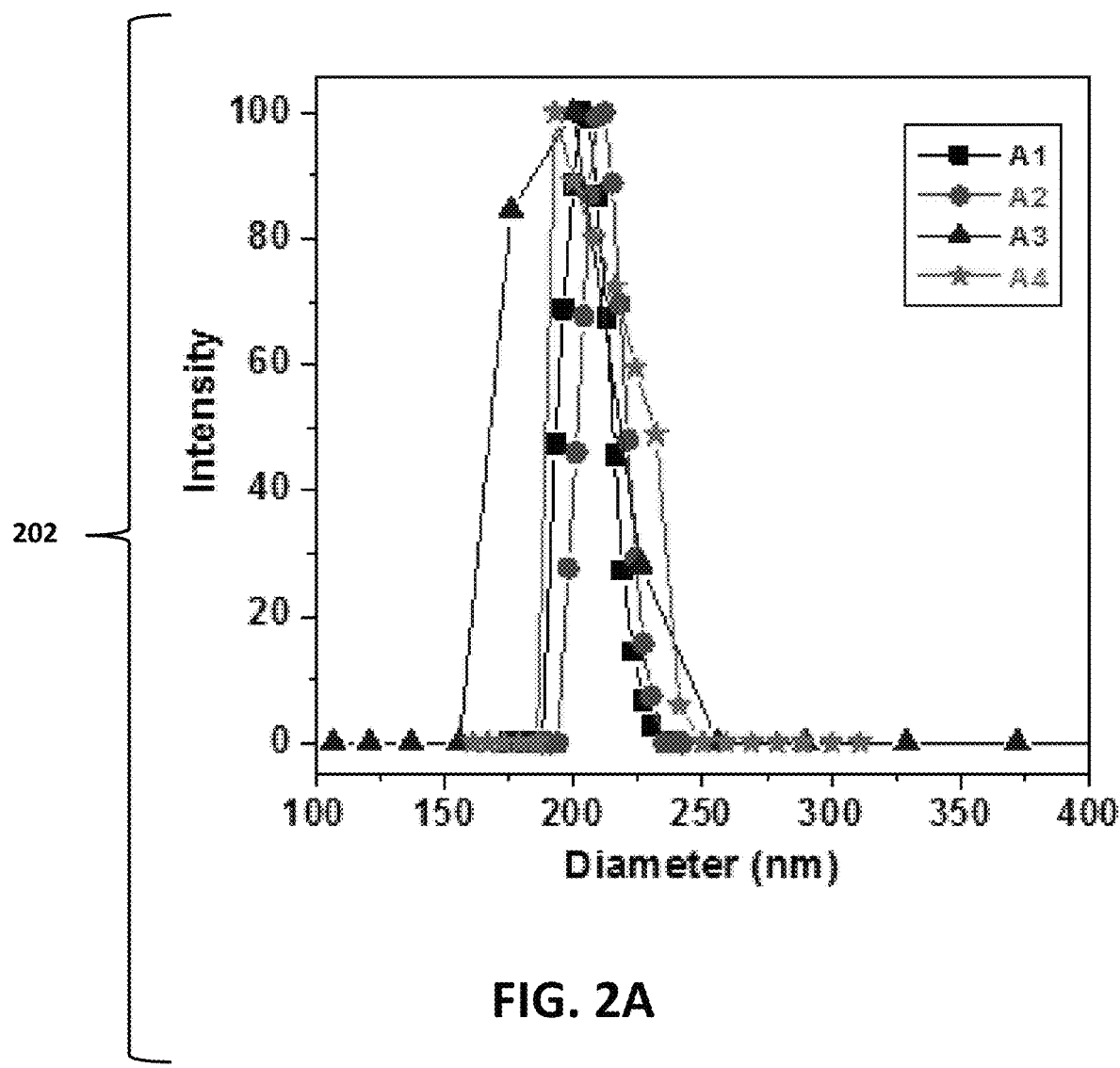
FIGS. 2A-2D illustrate the particle size distributions of the matrix quadrants A, B, C, D
Figure 2B:
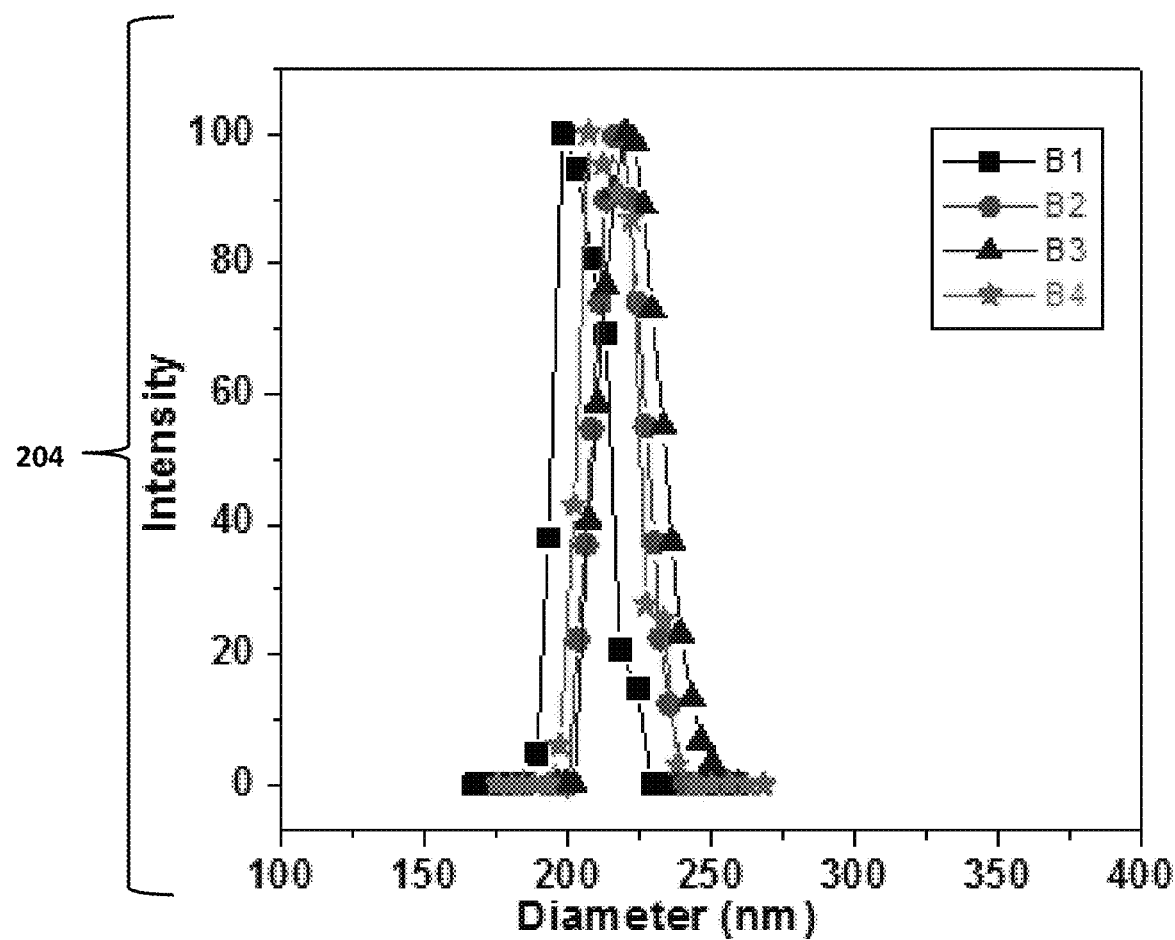
Figure 2C:
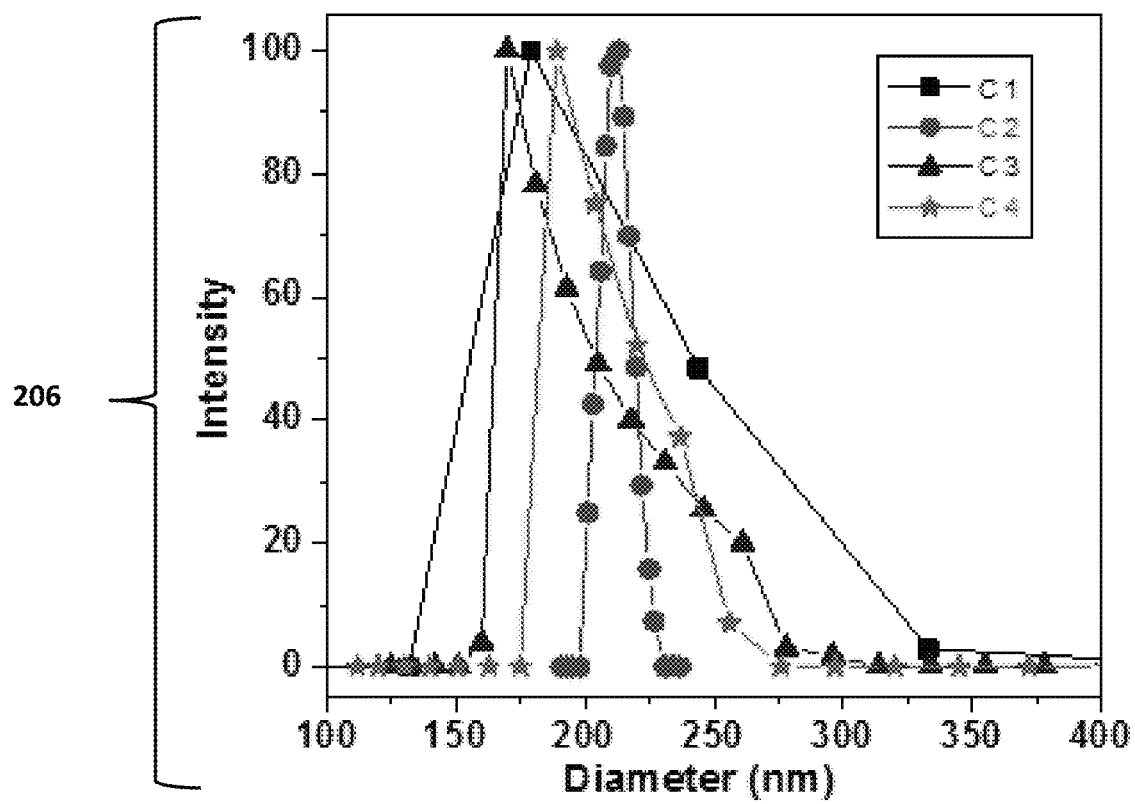
Figure 2D:
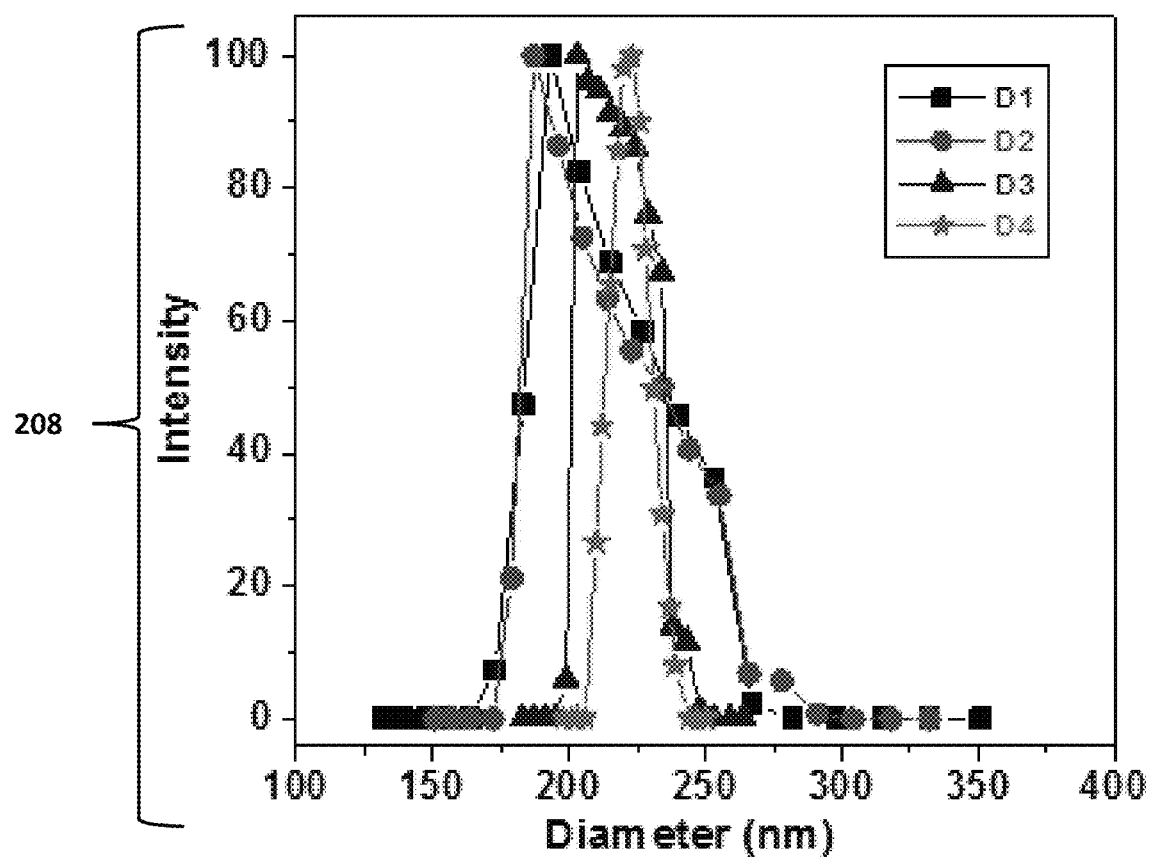

The instant invention provides an improved class of latexes with specific combinations of reactive surfactants—both nonionic and anionic—as depicted in Formulas I-IV below, for use in both conventional aqueous emulsion polymers, as pigment dispersants, and in coatings for UV curing. The reactive surfactant combinations chosen are copolymers of two or more moles of allyl glycidyl ether (AGE) and ethylene oxide terminated on one end with a hydrophobic moiety. The addition of a second equivalent of AGE group significantly reduces the amount of nonreactive surfactant in the product so that increases in coating repellency (of water) may be achieved.

The reactive surfactant of formula (I) is an anionic surfactant of structure:

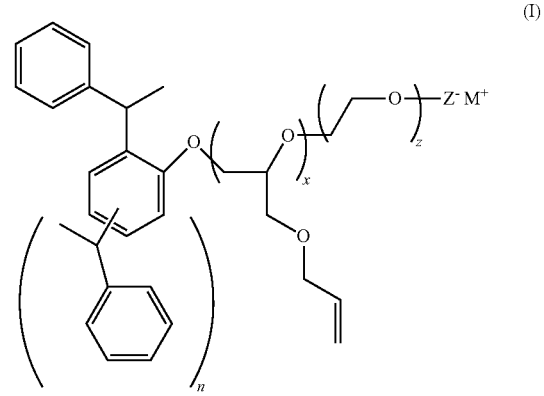

(I)

where, n=1, 2, x is 1-10 more preferably 1-5 and most preferably 1, z is 4-200 more preferably from about 5 to 60, and most preferably 16; $Z^-$ can be either $SO_3^-$ or $PO_3^{2-}$ and most preferably $SO_3^-$, and $M^+$ is $Na^+$, $K^+$, $NH_4^+$, or an alkanolamine, and is most preferably $NH_4^+$.

The present invention is further directed towards the emulsion polymerization of ethylenically unsaturated monomers in the presence of a nonionic surfactant of formula (II)

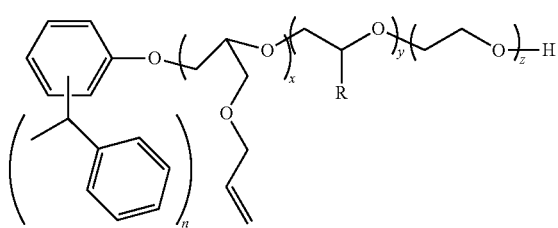

(II)

where n=1, 2, x is 1-10 more preferably 1-5 and most preferably 1, y is 0, 1, or 2, z is 4-200 more preferably from about 5 to 60, and most preferably 16, and where the reactive surfactant of formula (II) is used in combination with the reactive surfactant of formula (I). Reactive surfactants selected from formulas (I) and (II) contain only one reactive group.

The present disclosure further provides for the emulsion polymerization of ethylenically unsaturated monomers in the presence of a nonionic surfactant of formula (III)

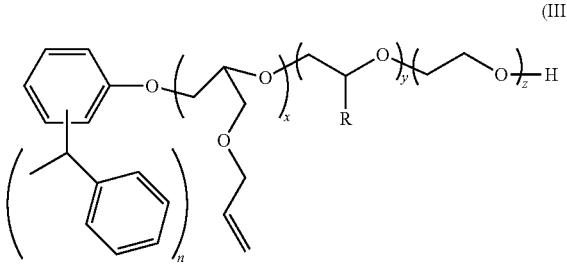

(III)

where n=1, 2, x is 1-10 more preferably 1-5 and most preferably 2, y is 0 1, or 2, z is 4-200 more preferably from about 5 to 60, and most preferably 15, and where the reactive surfactant of formula (III) is used in combination with one or more of the reactive surfactant of formulas (I) and (II).

The reactive surfactant of formula (IV) is an anionic surfactant of structure:

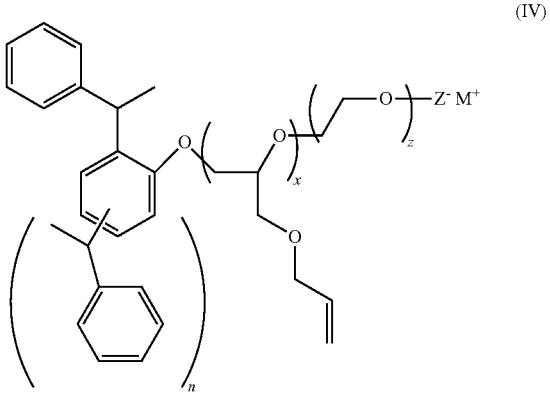

(IV)

where, n=1, 2, x is 1-10 more preferably 1-5 and most preferably 2, z is 4-200 more preferably from about 5 to 60, and most preferably 15; $Z^-$ can be either $SO_3^-$ or $PO_3^{2-}$ and most preferably $SO_3^-$, and $M^+$ is $Na^+$, $K^+$, $NH_4^+$, or an alkanolamine, and is most preferably $NH_4^+$, and where the reactive surfactant of formula (IV) is used in combination with one or more of the reactive surfactant of formulas (I), (II) and (III).

The reactive surfactant of formula (V) is an anionic surfactant of structure:

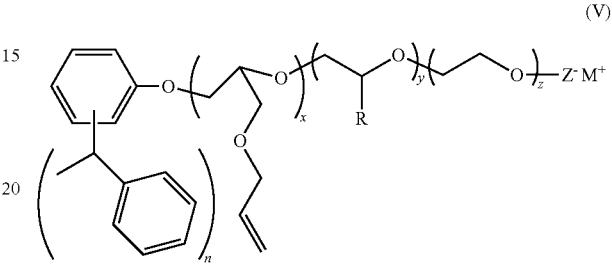

(V)

where, n=1, 2, x is 1-10 more preferably 1-5 and most preferably 2, y is 0, 1, or 2, z is 4-200 more preferably from about 5 to 60, and most preferably 15; $Z^-$ can be either $SO_3^-$ or $PO_3^{2-}$ and most preferably $PO_3^{2-}$, and $M^+$ is $Na^+$, $K^+$, $NH_4^+$, or an alkanolamine, and is most preferably $NH_4^+$, and where the reactive surfactant of formula (V) is used in combination with one or more of the reactive surfactants of formulas (I), (II), (III) and (IV).

Reactive surfactants selected from formulas (III) and (IV) and (V) contain two reactive groups. These reactive surfactants may contain various hydrophobes such as styrenated phenol ethers, alkyl ethers such as tridecyl alcohol, or alkylphenol ethers. Varying the level of ethoxylation or propoxylation and adjusting the size of the hydrophobe results in being able to tailor the structure for optimal performance.

Other monomers may be included in the copolymer along with AGE and EO. These include propylene oxide (PO) and other epoxides such as 1, 2-butylene oxide, styrene oxide, or 1, 2-tetradecane oxide.

These nonionic copolymers may be optionally further derivatized to convert them to anionic surfactants. Examples of these include sulfonates, phosphate esters, carboxylates, and sulfosuccinates.

These surfactants impart improved properties to traffic markings obtained with these novel surfactants, including low particle size distribution, improved scrubs resistance, freeze-thaw stability, improved gloss, water wash-off resistance, and pavement marking properties.

Generally, the latex particles are prepared by mixing monomers together to form a monomer mixture. A surfactant or surfactants is (are) then added to the monomer mixture and added to water with mixing to form an emulsion. The surfactant(s) may include a reactive surfactant, a nonreactive surfactant, or a combination of reactive and nonreactive surfactants. In one embodiment of the invention, nonreactive surfactants can be used to form the latex particle, and reactive surfactants can be used, either in concert or added in a second step. Alternatively, polymerization can be carried out as a soap-free polymerization, with at least two reactive surfactants being added near the end of the latex polymerization yielding a relatively low viscosity of 68 mPaS at 22.3° C., a particle size of 230 nm, and a particle size distribution of 1.2 and using a Coulter Counter measuring particle diameter vs. intensity.

DETAILED DESCRIPTION OF THE INVENTION

The present invention is directed to novel latexes containing specific combinations of reactive surfactants prepared by emulsion polymerization and the use of the resulting compositions.

The invention provides reactive surfactants having the following formulas:

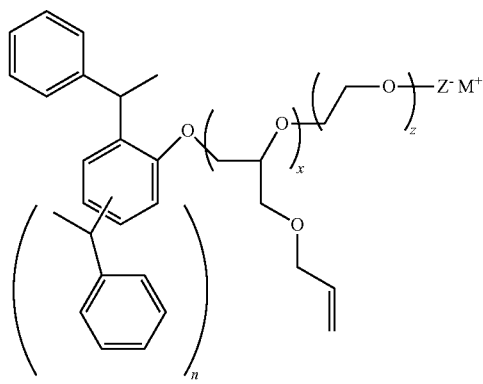
(I)

where, n=1, 2, x is 1-10 more preferably 1-5 and most preferably 1, z is 4-200 more preferably from about 5 to 60, and most preferably 16; $Z^-$ can be either $SO_3^-$ or $PO_3^{2-}$ and most preferably $SO_3^-$, and $M^+$ is $Na^+$, $K^+$, $NH_4^+$, or an alkanolamine, and is most preferably $NH_4^+$.

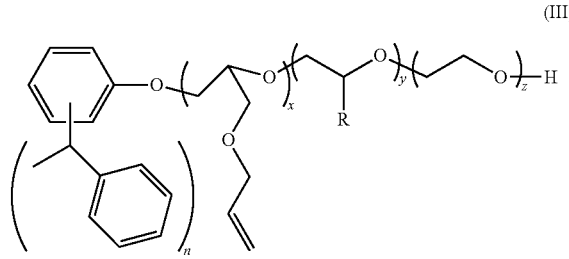
(II)

where n=1, 2, x is 1-1.0 more preferably 1-5 and most preferably 1, y is 0, 1, or 2, z is 4-200 more preferably from about 5 to 60, and most preferably 16;

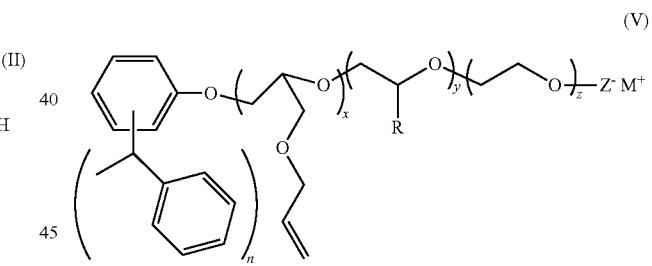
(III)

where n=1, 2, x is 1-10 more preferably 1-5 and most preferably 2, y is 0, 1, or 2 z is 4-200 more preferably from about 5 to 60, and most preferably 15, and where the reactive surfactant of formula (III) is used in combination with one or more of the reactive surfactant of formulas (I) and (II).

The reactive surfactant of formula (IV) is an anionic surfactant of structure:

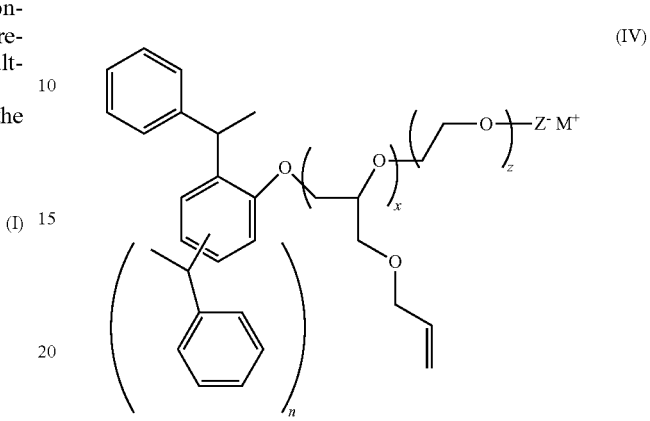
(IV)

where, n=1, 2, x is 1-10 more preferably 1-5 and most preferably 2, z is 4-200 more preferably from about 5 to 60, and most preferably 15; $Z^-$ can be either $SO_3^-$ or $PO_3^{2-}$ and most preferably $SO_3^-$, and $M^+$ is $Na^+$, $K^+$, $NH_4^+$, or an alkanolamine, and is most preferably $NH_4^+$, and where the reactive surfactant of formula (IV) is used in combination with one or more of the reactive surfactant of formulas (I), (II) and (III).

The reactive surfactant of formula (V) is an anionic surfactant of structure:

(V)

where, n=1, 2, x is 1-10 more preferably 1-5 and most preferably 2, y is 0, 1, or 2, z is 4-200 more preferably from about 5 to 60, and most preferably 15; $Z^-$ can be either $SO_3^-$ or $PO_3^{2-}$ and most preferably $PO_3^{2-}$, and $M^+$ is $Na^+$, $K^+$, $NH_4^+$, or an alkanolamine, and is most preferably $NH_4^+$, and where the reactive surfactant of formula (V) is used in combination with one or more of the reactive surfactants of formulas (I), (II), (III) and (IV).

The reactive surfactants can be manufactured by reacting one equivalent of either the di- or tri-styrenated phenol or other hydroxyl containing materials with 2 or more equivalents of allyl glycidyl ether in an autoclave using potassium hydroxide catalyst at a temperature in the range of 100-110 C to produce an adduct having at least two equivalents of allyl glycidyl ether. The resulting adduct is then reacted with an alkylene oxide, mixtures of alkylene oxides and styrene oxide in the presence of a basic catalyst such as potassium hydroxide or an alkali metal alkoxide such as sodium or potassium methoxide.

More specifically the process for alkoxylation includes the steps of: adding the catalyst to the organic compound containing at least one hydroxyl group; heating and pressurizing a reactor containing the hydroxyl containing organic compound; supplying alkylene oxide to said organic compound and catalyst at a process temperature of between 50° and 250° C. and at a pressure of between 100 and 700 kPa and isolating the alkoxylation products.

The alkylene oxides useful for the alkoxylation reaction are selected from the group consisting of ethylene oxide, propylene oxide, butylenes oxide, $C_5$-$C_{18}$ oxides and styrene oxide. The alkylene oxide groups may be arranged at random or in blocks. Particular preference is given to block arrangements with fairly hydrophobic groups such as propylene oxide or, butylene oxide. The ratio of the molar amounts of the ethylene oxide groups to the other hydrophobic alkylene oxide groups is adjusted as necessary to achieve the desired properties.

The performance properties of the reactive surfactants of the invention may be optimized for a specific application by appropriate modification such as the degree of alkoxylation and the different alkylene oxides that are used, and the choice of the end cap groups. It is clear that manipulation of these, variables allows access to materials which can perform as excellent emulsifiers.

The present disclosure is also directed towards the emulsion polymerization of ethylenically unsaturated monomers in the presence of an anionic surfactant of formula (I):

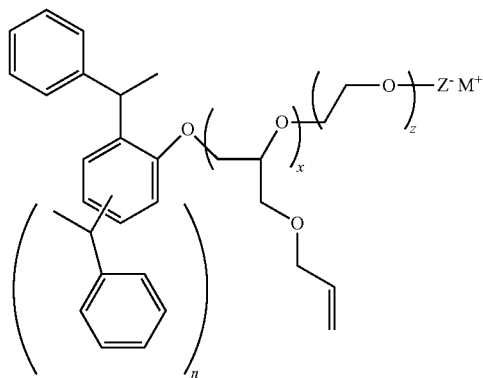

(I)

where, n=1, 2, x is 1-10 more preferably 1-5 and most preferably 1, z is 4-200 more preferably from about 5 to 60, and most preferably 16; Z can be either $SO_3^-$ or $PO_3^{2-}$ and most preferably $SO_3^-$, and $M^+$ is $Na^+$, $K^+$, $NH_4^+$, or an alkanolamine, and is most preferably $NH_4^+$.

The present invention is further directed towards the emulsion polymerization of ethylenically unsaturated monomers in the presence of a nonionic surfactant of formula (II)

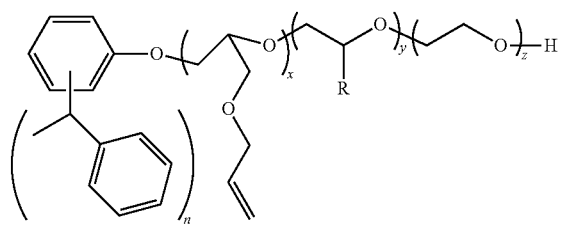

(II)

where n=, 2, x is 1-10 more preferably 1-5 and most preferably 1, y is 0, 1, or 2, z is 4-200 more preferably from about 5 to 60, and most preferably 16, and where the reactive surfactant of formula (II) is used in combination with the reactive surfactant of formula (I). Reactive surfactants selected from formulas (I) and (II) contain only one reactive group The present disclosure further provides for the emulsion polymerization of ethylenically unsaturated monomers in the presence of a nonionic surfactant of formula (III)

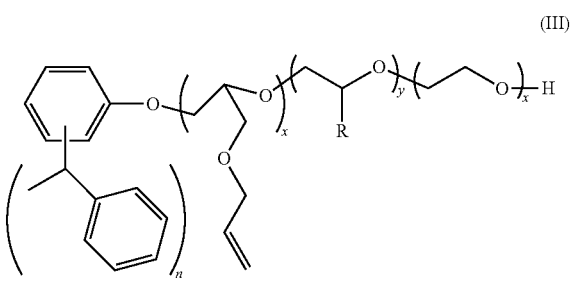

(III)

where n=1, 2, x is 1-10 more preferably 1-5 and most preferably 2, y is 0, 1, or 2, z is 4-200 more preferably from about 5 to 60, and most preferably 15, and where the reactive surfactant of formula (III) is used in combination with one or more of the reactive surfactant of formulas (I) and (II).

The present disclosure further provides for the emulsion polymerization of ethylenically unsaturated monomers in the presence of a nonionic surfactant of formulae (IV) or (V)

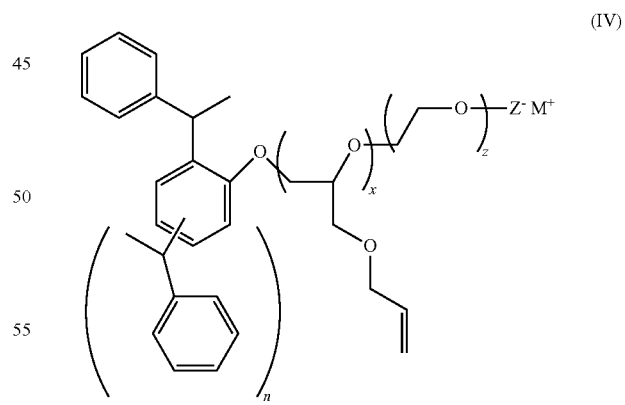

(IV)

where, n=1, 2, x is 1-10 more preferably 1-5 and most preferably 2, z is 4-200 more preferably from about 5 to 60, and most preferably 15; Z can be either $SO_3^-$ or $PO_3^{2-}$ and most preferably $SO_3^-$, and $M^+$ is $Na^+$, $K^+$, $NH_4^+$, or an alkanolamine, and is most preferably $NH_4^+$, and where the reactive surfactant of formula (IV) is used in combination with one or more of the reactive surfactant of formulas (I), (II) and (III);

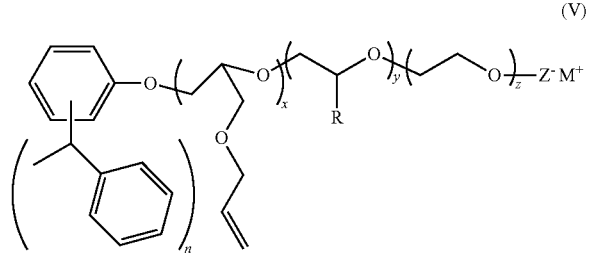

(V)

where, n=1, 2, x is 1-10 more preferably 1-5 and most preferably 2, y is 0, 1, or 2, z is 4-200 more preferably from about 5 to 60, and most preferably 15; Z can be either $SO_3^-$ or $PO_3^{2-}$ and most preferably $PO_3^{2-}$, and $M^+$ is $Na^+$, $K^+$, $NH_4^+$, or an alkanolamine, and is most preferably $NH_4^+$, and where the reactive surfactant of formula (V) is used in combination with one or more of the reactive surfactants of formulas (I), (II), (III) and (IV).

The compounds of formulas (I)-(VI) may be used separately or in combination in an emulsion polymerization. When used in combination, the ratio of compounds of formulae (I) to (V) is not limited but is dictated by the desired emulsion properties. Surfactants of formulas (I) to (V) may also be used in combination with other surfactants that are commonly used in the art When used in combination, the ratio of surfactants is not specific but is commonly optimized based on the nature of the ethylenically unsaturated monomers present in a given composition. The total amount of surfactants of formulas (I) to (V) that may be used in the present invention is preferably from about 0.1% to about 20% based on total weight of the monomer, more preferably from about 0.2% to about 10%, and most preferably from about 0.5% to about 7% based on the total weight of the monomer. The latexes using the reactive surfactants of compounds with formulas (I) thru (V) may also be used in combination with conventional surfactants in order to improve emulsion properties.

Other surfactants that are commonly used in the emulsion polymerization process include both anionic and nonionic molecules. Commonly utilized anionic surfactants in the emulsion polymerization process include sodium alkylbenzene sulfonates, alkyldiphenyloxide disulfonates, ethoxylated alkylphenol sulfates and phosphates, alkyl sulfosuccinates, and sulfates and phosphates of fatty alcohols, etc. Commonly utilized nonionic surfactants include linear and branched alcohol ethoxylates, and alkylphenol ethoxylates, particularly octylphenol ethoxylates. When used in combination with other surfactants the ratios are not limited but are also dictated by the desired emulsion properties.

Suitable monomers that may be polymerized by the practice of the present invention include numerous ethylenically unsaturated monomers such as vinyl monomers or acrylic monomers. Typical vinyl monomers suitable for use in accordance with the present invention include, but are not limited to, vinyl esters such as vinyl acetate, vinyl propionate, vinyl benzoate, etc.; vinyl aromatic hydrocarbons such as styrene, methyl styrenes, other vinyl aromatics such as vinyl toluenes, vinyl napthalenes, divinyl benzene, etc. Halogenated vinyl monomers such as vinyl chloride, vinylidene chloride, etc. may also be used.

Suitable acrylic monomers which may be used in accordance with the present invention comprise compounds with acrylic functionality such as alkyl acrylates and methacrylates, Alkenyl aromatic monomer, acrylate acids and methacrylate acids as well as acrylamides and acrylonitrile. Typical-acrylic monomers include, but are not limited to methyl acrylate and methyl methacrylate (MMA), ethyl, propyl, and butyl acrylate (BA), and methacrylate (MA), benzyl acrylate and methacrylate, cyclohexyl acrylate and methacrylate, ethyl hexyl, decyl and dodecyl, isobornyl acrylate and methacrylate, etc. Other typical acrylic monomers include hydroxy alkyl acrylates and methacrylates such as hydroxypropyl and hydroxyethyl acrylate and methacrylate, acrylic acids such as methacrylic and acrylic acid, and amino acrylates and methacrylates. Alkenyl aromatic monomers such as styrene, o, p-dimethyl styrene, o, p-diethyl styrene, m-methyl-styrene, p-chlorostyrene, o-methyl-p-isopropyl styrene, o, p-dichlorostyrene, isopropyl styrene, t-butyl styrene, p-fluorostyrene, p-acetoxystyrene, p-butylstyrene, and mixtures thereof can also be incorporated. It will be recognized by those familiar with the art that other unsaturated monomers which are suitable for free radical addition polymerization may also be used in accordance with the present invention.

Numerous free radical forming compounds are utilized as catalysts in the emulsion polymerization process. Typically compounds used as catalysts are those that from free radicals via thermal decomposition, referred to in the art as "thermal initiators" or combinations of compounds that form free radicals via oxidation/reduction reactions. Such catalysts are combinations of an oxidizing agent and a reducing agent and are commonly referred to in the art as "redox initiators." Either thermal or redox catalysts may be used to practice the present invention.

Typical catalysts utilized as thermal initiators include persulfates, specifically potassium persulfate, sodium persulfate, ammonium persulfate (APS) and the like. Typical redox initiators include combinations of oxidizing agents or initiators such as peroxides, specifically benzoyl peroxide, t-butyl hydroperoxide, lauryl peroxide, hydrogen peroxide, 2,2'-diazobisiso-butyronitrile, and the like. Typical reducing agents include sodium bisulfite, sodium metabisulfite (SMBS), sodium formaldehyde sulfoxylate, sodium hydrosulfite, and ascorbic and isoascorbic acid. In the presence of redox initiators, persulfates can act as oxidizing agents, such as in the present disclosure. In the present reaction, an APS-SMBS catalyst or initiator is employed in an amount preferably from 0.1 to 3 weight percent of the total monomer weight, and most preferably from about 0.1 to 1 weight percent of the total monomer charge.

Other additives or components which are known to those skilled in the art may also be used in accordance with the present invention. These include chain transfer agents, which are used to control molecular weight, additives to adjust pH, and compounds utilized as protective colloids which provide additional stability to the latex particles.

The typical components used in an emulsion polymerization are listed in the following generalized recipe:

| Component | %-Wet Basis |
|---|---|
| Monomers | 30-60 |
| Surface-active agents | 1-3 |
| Protective colloid | 0-3 |
| Initiator | 1-3 |
| Modifier | 0-1 |

-continued

| Component | %-Wet Basis |
|---|---|
| Buffer | 0-1 |
| Water | 50-70 |

The emulsifiers suspend monomer droplets and polymer particles. Modifiers may be aldehydes, mercaptans or chlorinated hydrocarbons that control the polymerization reaction restricting cross-linking and controlling the molecular weight. Protective colloids, such as polyvinyl alcohol or methyl cellulose, are used to stabilize the final latex. Buffer salts control the pH of the emulsion polymerization batch. These salts, such as phosphates, citrates, acetates and carbonates, are important because pH affects reaction rate, particle size and other reaction conditions.

In some cases the monomer emulsion is seeded with polymer particles. The purpose of seeded emulsion polymerization is to avoid the uncertainties of the particle initiation stage, obtain better batch-to-batch reproducibility, and give a stable latex of the desired particle size. The reasons for polymerizing in water include: more rapid polymerization than bulk polymerization at the same temperature with a greater average molecular weight; good heat transfer in water with better control of heat of polymerization; all of the monomer is consumed in the polymerization and the resulting latex can be used directly in coating applications; and the aqueous phase lowers the overall viscosity of the emulsion.

The monomer emulsion is made up of water-immiscible monomer droplets stabilized by surfactant molecules, empty micelles (colloidal surfactant vesicles) and monomer-swollen micelles. The monomer droplets can range in size from less than one micrometer to ten micrometers. The size of micelles is about 10 to 15 nanometers. During the reaction, the monomer molecules diffuse from the droplet reservoirs to the micelles where polymerization takes place. The polymer chains grow in the micelles. As polymerization proceeds, the monomer droplets decrease in size and eventually disappear. When the polymer particles become large, the surfactant molecules in the micelles suspend the polymer particles. The final polymer particles grow to a size range of a few tenths of a micrometer up to one micrometer. The physical character of the final polymer depends on the temperature of reaction, the composition and the manipulation of the reaction conditions, such as when and how much of the ingredients are added to the reactor.

A homogenizer is used in emulsion polymerization to emulsify the monomer into the premix to the reactor. Of all the emulsion monomers, vinyl chloride polymerization is the one that most commonly uses homogenizers to prepare the mix. In a typical process the ingredients to make the polymer are added in the appropriate sequence to an evacuated, agitated, pressurized tank (pressurized with nitrogen gas). After mixing the ingredients and adjusting the temperature of the mix, the emulsion is homogenized to produce the desired monomer droplet size. The homogenizing pressure may be in the range of 1000 to 5000 psi, depending on the monomer and the required droplet size of the monomer reservoir. This monomer droplet size affects the physical character of the final latex particles. From the homogenizer the emulsion goes to the reactor, where polymerization occurs at a controlled temperature, until the desired conversion is achieved. After completion of the reaction, the latex is cooled and removed from the reactor.

Any other of the conventional methods employed in the emulsion polymerization process may also be used in accordance with the present invention. These include both standard and pre-emulsion monomer addition techniques as well as staged monomer addition.

The invention further provides pigment dispersions suitable for preparation of coating compositions wherein a pigment is finely and stably dispersed in a high concentration in aqueous and non-aqueous solvents for applications in industrial applications including inks, paints, stains, pigmented photoresists and the like.

More specifically the invention also provides a pigment dispersion comprising: (a) a pigment; (b) a solvent; and (c) a combination of dispersing surfactants according to the formulas I-V as described above.

EXAMPLES

The present invention is illustrated by the following Examples, but should not be construed to be limited thereto. In the Examples, "part" and "%" are all part by weight or % by weight unless specified otherwise.

Example 1: Reaction Conditions for the Preparation of the B4 Latex Binder

In order to change the architecture of the polymer chains and distribution of polymerizable surfactants and acid groups in the latex particles, additional possible reaction conditions for the B4 latex binder have been included as items a-f in Tables 1A and 1B below. Reaction temperatures were tried at both 85° C. and 75° C. during surfactant additions, which were modified to include continuous feed or staged addition (by placing ¼ amount of total surfactants in the first half volume of emulsion and ¾ amount of total surfactants in the second half volume of emulsion), and by using a midpoint technique by adding methacrylic acid (MAA) at the midpoint of the total emulsion of staged surfactant addition compositions. The midpoint addition during the latex reaction as defined herein, can occur in one of at least two methods. One method is to take the initial feed emulsion and split it into two (halved) portions. MAA is added only to the second portion where the concentration of the emulsion has already included the complete addition of the components. The other midpoint method occurs as the pre-emulsion is formed using water, reactive surfactants, and the monomers, followed by adding the MAA at the half volume of the initially prepared emulsion. Once half of the pre-emulsion is added, the MAA is subsequently added into the remaining emulsion, which is added, together with the remaining portion of the initiator, to the reaction kettle forming the final latex emulsion (see Example 5).

TABLE 1A

Possible Reaction Conditions for Latex Compositions

| | Temp. | Surfactants placement | Add MAA at mid-point as defined herein |
|---|---|---|---|
| a | 85 | Continuous | N/A |
| b | 75 | Continuous | N/A |
| c | 85 | ¼ first half, ¾ Second half | N/A |
| d | 75 | ¼ first half, ¾ Second half | N/A |
| e | 85 | ¼ first half, ¾ Second half | add MAA |
| f | 75 | ¼ first half, ¾ Second half | add MAA |

TABLE 1B

Possible Reaction Scenarios Conditions for Producing the B4 Latex Compositions from Table 1A

| A3 | a | b | c | d | e | f |
|---|---|---|---|---|---|---|
| A4 | a | b | c | d | e | f |
| B3 | a | b | c | d | e | f |
| B4 | a | b | c | d | e | f |

The latex binder used in the present disclosure as the B4 composition was prepared only by the reaction parameters described for a in Tables 1A and 1B above. Other reaction conditions leading to other latex compositions which pass the water wash off test (ASTM D7377 and D711) are found below in Examples 7 and 8 (results in FIGS. 7A and B) and also part of the present disclosure.

Example 2: Seed Preparation for Latex Polymer (Emulsion Polymerization)

Components of the seed preparation composition were added to a glass reaction kettle of 4 liter volume at room temperature in specified amounts according to the sequence in Table 2. The mixture was stirred for 1 hour at room temperature. The contents were next heated at approximately 3° C./min up to a final temperature of 85° C. As the temperature reaches 63° C., an exothermic event takes place. Approximately 423 g of distilled water is then added to keep the kettle temperature maintained under 85° C. Once the temperature is stabilized at 85° C., the temperature was maintained for additional 1.5 hours before stopping the reaction. The resulting seed was then filtered through a 300 mesh screen to remove any residual coagulum.

TABLE 2

Seed Recipe for Latex Polymer Compositions.

| | Component | Weight, g |
|---|---|---|
| Kettle | SDS* (30% active) | 210.8 |
| | NaHCO$_3$ | 4.6 |
| | DW** | 503.3 |
| | BA | 158.0 |
| | MMA | 189.5 |
| | MAA | 6.8 |
| | APS | 16.2 |
| | DW for cooling | 423.0 |

*SDS—sodium dodecyl sulfate
**DW—distilled waterExample 3: Latex Preparation of B4 Composition

Example 3: Preparation of the B4 Latex Binder and Combined Reactive Surfactants The desired amount of reactive surfactant combinations of ERS-1596 (7.0 g) and ERS-1616 (7.0 g) and 270.0 g deionized (DI) water were added to a 2000 ml beaker. After the surfactants have completely dissolved in the DI water, NaHCO$_3$ (4.0 g) was added. The monomer mixtures of butyl acrylate (BA) and methyl methacrylate (MMA), as shown below in Table 3, were added into the beaker to obtain the pre-emulsion. The seed latex prepared above, DI water, NaHCO$_3$, and initiator, with weights as shown in Table 3, were added to the kettle at a temperature of 85° C. The temperature of the kettle decreases due to the addition of the mixture. As the kettle temperature increases back to 85° C., the pre-emulsion mixture (983.0 g) and initiator (2.1 g) were concurrently added into the seed latex (see Table 2) at a constant rate over a period of 3 hours. The polymerization was maintained at 85° C. under a nitrogen purge. After the addition of all provided ingredients, the contents were heated at 85° C. for additional 2 hours to digest the residual monomers. The latex was then filtered through a 300 mesh screen to remove any residual coagulum.

ERS-1596 and ERS-1616 are both supplied by Ethox Chemicals of Greenville, S.C.

TABLE 3

Recipe for B4 Latex Polymer Composition

| | Component | Amount |
|---|---|---|
| Kettle | Seed | 32.0 |
| | DI Water | 275.4 |
| | NaHCO3 | 0.4 |
| | APS | 0.2 |
| Pre-Emulsion | BA | 315.9 |
| | MMA | 379.0 |
| | NAHCO3 | 4.0 |
| | ERS-1596 | 7.0 |
| | ERS-1616 (30% active) | 7.0 |
| | DW | 270.0 |
| Initiator | APS | 2.1 |
| | DW | 30.0 |
| Rinse | DW | 40.0 |

To better define surfactant efficiency, "active" weight percentage is often used to define surfactant concentration. Normally the surfactant in this case is diluted with water.

Example 4: Preparation of Latex Binder with Surfactants Added to the B4 Composition: Staged Addition Vs. Continuous Feed The desired amount of ERS-1596 (1.8 g) and ERS-1616 (5.3 g) surfactants and deionized water (135.0 gram) were each added to a2000 ml beaker (notated as #1 and #2). After the surfactants have completely dissolved in water, NaHCO$_3$ (2.0 g) was added to each of the two beakers, respectively. Next, the monomer mixtures of butyl acrylate (BA) and methyl methacrylate (MMA), as shown below in Table 4, were added into the beakers to obtain a pre-emulsion. The seed latex (as prepared in example 2), DI water, NaHCO$_3$, and initiator, with weights as shown in Table 4, were added to the kettle at a temperature 85° C. The temperature of the kettle decreases due to the addition of the mixture. As the kettle temperature decreased back to 85° C., the pre-emulsion mixture (983.0 g) and initiator (2.1 g) were concurrently added into the seed latex at a constant rate over a period of 3 h. The polymerization was maintained at 85° C. under nitrogen purge. After final addition of the ingredients in Table 4, the contents were heated at 85° C. for additional 2 h to digest the residual monomers. The latex was then filtered through a 300 mesh screen to remove any residual coagulum.

TABLE 4

Surfactants placement in B4 composition: Staged Addition vs. Continuous Feed

| | Component | Amount, g |
|---|---|---|
| Kettle | Seed | 32.0 |
| | DI Water | 275.4 |
| | NaHCO3 | 0.4 |
| | APS | 0.2 |

TABLE 4-continued

Surfactants placement in B4 composition:
Staged Addition vs. Continuous Feed

|  | Component | Amount, g | |
|---|---|---|---|
| Pre-Emulsion | Beaker | #1 | #2 |
|  | BA | 158.0 | 158.0 |
|  | MMA | 189.5 | 189.5 |
|  | NAHCO3 | 2.0 | 2.0 |
|  | ERS1596 | 1.8 | 5.3 |
|  | ERS1616 (30% active) | 1.8 | 5.3 |
|  | DW | 135.0 | 135.0 |
| Initiator | APS | 2.1 | |
|  | DW | 30.0 | |
| Rinse | DW | 40.0 | |

Example 5: Preparation of Latex Binder by Adding MAA to the B4 Composition

The desired amount of ERS-1596 (7.0 g) and ERS-1616 (7.0 g) surfactants and DI Water (270.0 g) were added to a 2000 ml beaker. After the surfactants are completely dissolved in water, NaHCO$_3$ (4.0 g) were added. Next, the monomer mixtures of butyl acrylate (BA) and methyl methacrylate (MMA) as shown below in Table 5 were added to the beaker to obtain pre-emulsion. The seed latex as prepared above and shown in Table 2 with DI water, NaHCO$_3$, and initiator, (with the corresponding weights as shown in Table 5), were added to the kettle at a temperature 85° C. The temperature of the kettle will decrease due to addition of the mixture. As kettle temperature decreases back to 85° C., the pre-emulsion mixture (983.0 g) and initiator (2.1 g) were concurrently added into the seed latex at a constant rate over a period of 3 h. The polymerization reaction was maintained at 85° C. under nitrogen purge. As the emulsion reaction reached the reaction midpoint, MAA (6.0 g) was added. After finishing addition of the components as listed in Table 5, the contents were heated at 85° C. for additional 2 h so that the residual monomers could be consumed. The latex was then filtered through a 300 mesh screen to remove any residual coagulum.

TABLE 5

Components of the Latex Binder with the
Addition of MAA to the B4 Composition

|  | Component | Amount, g |
|---|---|---|
| Kettle | Seed | 32.0 |
|  | DI Water | 275.4 |
|  | NaHCO3 | 0.4 |
|  | APS | 0.2 |
| Pre-Emulsion | BA | 315.9 |
|  | MMA | 379.0 |
|  | MAA | 6.0 |
|  | At the reaction midpoint | |
|  | NAHCO3 | 4.0 |
|  | ERS1596 | 7.0 |
|  | ERS1616 (30% active) | 7.0 |
|  | DW | 270.0 |
| Initiator | APS | 2.1 |
|  | DW | 30.0 |
| Rinse | DW | 40.0 |

Example 6: Preparation of Latex Binder by Redox Initiators to B4 Composition The desired amount of ERS1596 (7.0 g) and ERS1616 (7.0 g) surfactants and deionized water (270.0 g) were added to a 2000 ml beaker. After the surfactants completely dissolved in water, NaHCO$_3$ (4.0 g) were added. Next, the monomer mixtures of butyl acrylate (BA) and methyl methacrylate (MMA) as also shown below in Table 6, were added into the beaker to obtain the pre-emulsion. The seed latex was prepared as described above DI water, NaHCO$_3$, and redox initiators (with the relative weights as also shown in Table 6) were added to kettle at a temperature of 85° C. The temperature of the kettle decreased due to the addition of the mixture. As kettle temperature recedes back to 85° C., the pre-emulsion mixture (983.0 g) and initiators (APS, 2.1 g, SMBS, 1.5 g) were concurrently added into the seed latex at a constant rate over a period of 3 h. The polymerization reaction was maintained at 85° C. under nitrogen purge. After finishing addition of the components in Table 6, the entire content was heated to 85° C. for an additional 2 h to fully digest (consume) the residual monomers. The latex was then filtered through a 300 mesh screen to remove any residual coagulum—the clumping of the surfactants that don't react with the latex.

TABLE 6A

Reaction Conditions Corresponding with the
Method of Adding Surfactants and MAA

|  | Temp, ° C. | Surfactants placement | Add MAA at midpoint |
|---|---|---|---|
| a | 85 | Continuous | N/A |
| b | 75 | Continuous | N/A |
| c | 85 | ¼ first half; ¾ Second half | N/A |
| d | 85 | ¼ first half; ¾ Second half | add 8 g MAA |
| e | 75 | ¼ first half; ¾ Second half | N/A |
| f | 75 | ¼ first half; ¾ Second half | add 8 g MAA |
| g | 65 | Continuous | N/A |
| h | 65 | ¼ first half; ¾ Second half | N/A |
| i | 65 | ¼ first half; ¾ Second half | add 8 g MAA |
| g | 55 | Continuous | N/A |
| h | 55 | ¼ first half; ¾ Second half | N/A |
| i | 55 | ¼ first half; ¾ Second half | add 8 g MAA |
| g | 55 | Continuous | N/A |
| h | 55 | ¼ first half; ¾ Second half | N/A |
| i | 55 | ¼ first half; ¾ Second half | add 8 g MAA |

TABLE 6B

B4 Composition of the Latex Binder Using Redox Initiator

|  | Component | Amount, g |
|---|---|---|
| Kettle | Seed | 32.0 |
|  | DI Water | 275.4 |
|  | NaHCO3 | 0.4 |
|  | APS | 0.2 |
|  | SMBS | 0.1 |
| Pre-Emulsion | BA | 315.9 |
|  | MMA | 379.0 |
|  | NAHCO3 | 4.0 |
|  | ERS1596 | 7.0 |
|  | ERS1616 (30% active) | 7.0 |
|  | DW | 270.0 |
| Initiator | APS | 2.1 |
|  | SMBS | 1.5 |
|  | DW | 30.0 |
| Rinse | DW | 40.0 |

Figure 6:
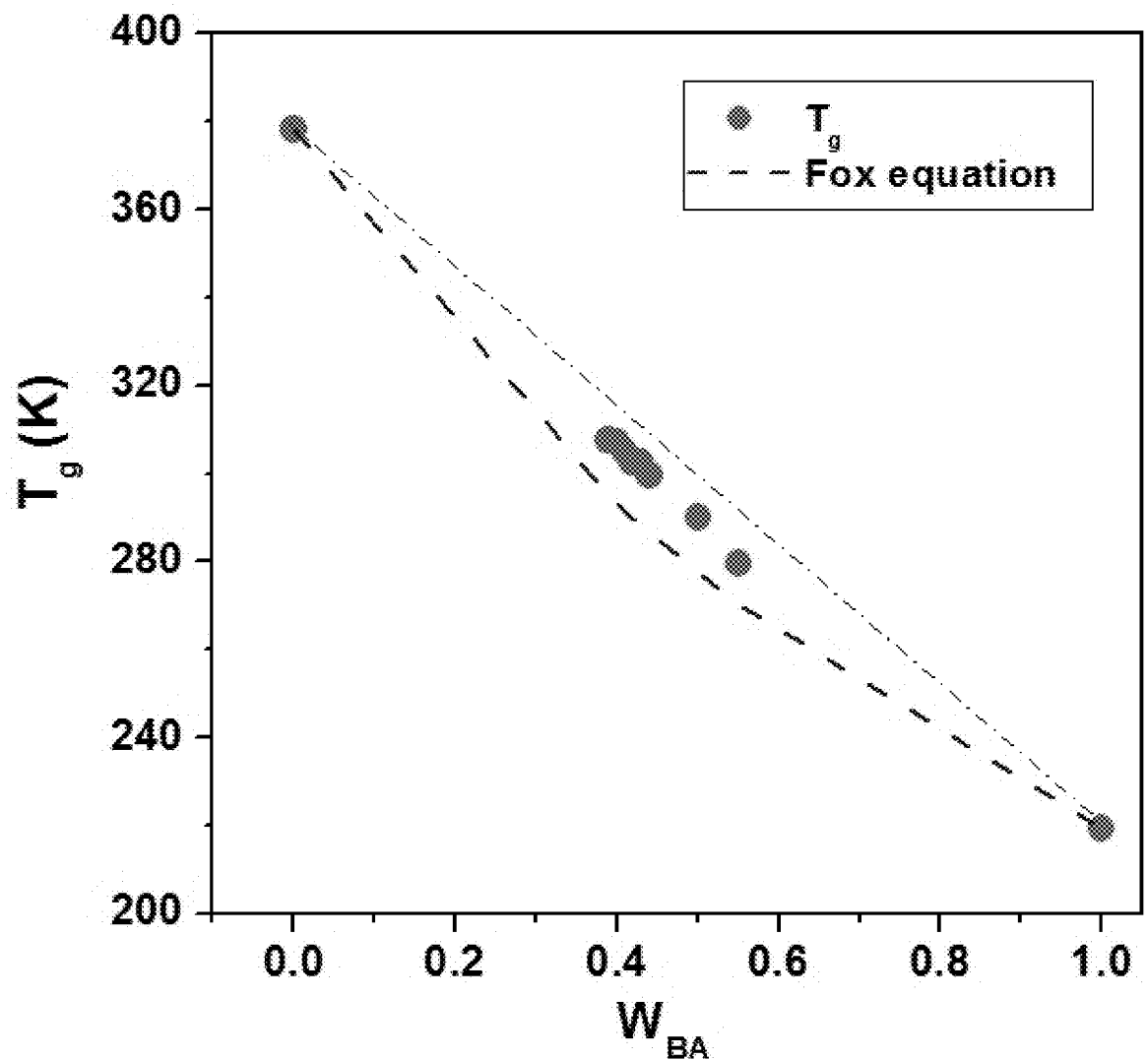
FIG. 6 is plot of the glass transition temperature changes vs concentration of ratios of BA to MAA in the latex composition.

In addition, we have investigated the variations in the weight content of BA to MAA in various B4 latex compositions. The Tables 7A and 7B below illustrate how the weight content of BA to MAA has been achieved. A correlation of the results obtained with this set of reactions in terms of changes in the glass transition temperature is shown in FIG. 6.

Example 7: Preparation of Latex Binder with a $T_g$ of 34° C.

The desired amount of ERS1596 (7.0 g) and ERS1616 (7.0 g) surfactants and deionized water (270.0 g) were added to a 2000 ml beaker. After the surfactants were completely dissolved in water, $NaHCO_3$ (4.0 g) was added. Next, the monomer mixtures of butyl acrylate (BA) and methyl methacrylate (MMA) in weights as shown below in Table 7B were added into the beaker to obtain the pre-emulsion. The seed latex prepared as described above (Example 1), DI water, $NaHCO_3$, and redox initiators with weights as shown in Table 7B were added to the kettle at a temperature of 85° C. The temperature of the kettle decreased due to addition of the mixture. As the kettle temperature increased to 85° C., the pre-emulsion mixture (983.0 g) and initiator (APS, 2.1 g) were concurrently added into the seed latex at a constant rate over a period of 3 h. The polymerization was maintained at 85° C. under nitrogen purge. After finishing addition of the components as shown in Table 7B, the entire content was heated at 85° C. for additional 2 h to ensure complete consumption of the residual monomers. The latex was then filtered through a 300 mesh screen to remove any residual coagulum.

TABLE 7A

Change in BA Monomer Content of the Latex Compositions Using Combination of ERS-1596 and ERS-1616 Reactive Surfactants

| | Temp, ° C. | Surfactants placement | Weight content of BA in monomers |
|---|---|---|---|
| 1 | 85 | Continuous | 0.39 |
| 2 | 85 | Continuous | 0.40 |
| 3 | 85 | Continuous | 0.41 |
| 4 | 85 | Continuous | 0.42 |
| 5 | 85 | Continuous | 0.43 |
| 6 | 85 | Continuous | 0.44 |
| 7 | 85 | Continuous | 0.50 |
| 8 | 85 | Continuous | 0.55 |

TABLE 7B

B4 Composition of the Latex Binder Using Redox Initiator and Varying Amounts of BA and MMA to Achieve a $T_g$ of 34 C.

| | Component | Amount, g |
|---|---|---|
| Kettle | Seed | 32.0 |
| | DI Water | 275.4 |
| | NaHCO3 | 0.4 |
| | APS | 0.2 |
| Pre-Emulsion | BA | 270.7 |
| | MMA | 423.3 |
| | NAHCO3 | 4.0 |
| | ERS1596 | 7.0 |
| | ERS1616 (30% active) | 7.0 |
| | DW | 270.0 |
| Initiator | APS | 2.1 |
| | DW | 30.0 |
| Rinse | DW | 40.0 |

Example 8: Preparation of Latex Binder with a $T_g$ of 6° C.

To achieve a lower Tg latex using the same reactive surfactants, the following procedure was used. The desired amount of ERS1596 (7.0 g) and ERS1616 (7.0 g) surfactants and deionized water (270.0 g) were added to a 2000 ml beaker. After the surfactants were completely dissolved in water, $NaHCO_3$ (4.0 g) were added. Next the monomer mixtures of butyl acrylate (BA) and methyl methacrylate (MMA) as shown below in Table 8 were added into the beaker to obtain the pre-emulsion. The seed latex prepared as described above, with DI water, $NaHCO_3$, and redox initiators (using the weights shown in Table 8) were added to the kettle at a temperature 85° C. The temperature of the kettle decreased due to addition of the mixture. As kettle temperature increased to 85° C., the pre-emulsion mixture (983.0 g) and initiator (APS, 2.1 g) were concurrently added into the seed latex at a constant rate over a period of 3 h. The polymerization was maintained at 85° C. under nitrogen purge. After finishing addition of the components as listed in Table 8, the entire content was heated to 85° C. for an additional 2 h to digest the residual monomers. The latex was then filtered through a 300 mesh screen to remove any residual coagulum.

TABLE 8

B4 Composition of the Latex Binder Using Redox Initiator and Varying Amounts of BA and MMA to Achieve a $T_g$ of 6° C.

| | Component | Amount, g |
|---|---|---|
| Kettle | Seed | 32.0 |
| | DI Water | 275.4 |
| | NaHCO3 | 0.4 |
| | APS | 0.2 |
| Pre-Emulsion | BA | 381.7 |
| | MMA | 312.3 |
| | NAHCO3 | 4.0 |
| | ERS1596 | 7.0 |
| | ERS1616 (30% active) | 7.0 |
| | DW | 270.0 |
| Initiator | APS | 2.1 |
| | SMBS | 1.5 |
| | DW | 30.0 |
| Rinse | DW | 40.0 |

FIG. 1 provides a reactive surfactant composition matrix [100] based on the combination content of the reactive surfactants of formulae (I) and (II). The x-axis provides the added weight percent (wt %) of Formula (I) [110], while the y-axis provides the added weight percent (wt %) of Formula (II) [120]. A compositions content of each reactive surfactant is determined by the intersection of each y-axis value for each x-axis value provided. The reactive surfactant combination for the composition of B4 [130] is therefore determined to be 1.0 wt % of Formula (I) with 1.0 wt % of Formula (II).

Figure 5:
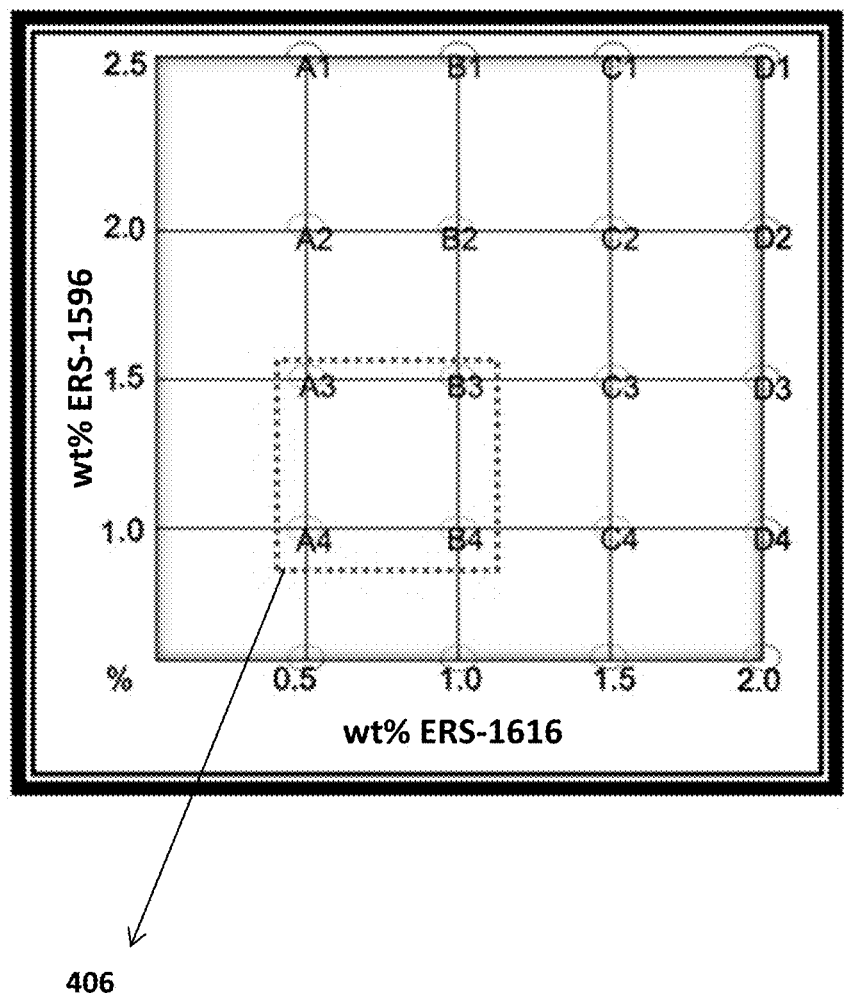
FIG. 5 describes the resulting polymer dispersions in relation to the reactive surfactant composition matrix.

Table 9 provides the physical characteristics of the novel latex compositions of the present disclosure. The viscosity of the latex compositions was determined using a Brookfield DV II+Viscometer using a #02 disc spindle at 20 rpm providing results in millipascal seconds (mPa s). Latex particle size distributions are provided as determined by either or both the use of Microtrac's Nanotrac Wave and the Brookhaven's 90Plus Particle Size Analyzer, where the particle size is determined using dynamic scattered light and measurements are provided in nanometers (nm). A further discussion of the particle size distributions is provided below. The solids content of the compositions were approximately 50% as determined by the Sartorius Mark3 LMA100P Moisture Analyzer, where heating a 1.5 g sample of latex to 150° C. for 4 minutes allows the instrument to calculate the weight difference of the initial sample and the heated sample. The glass transition temperatures were recorded using a Differential Scanning Calorimeter Q200 of TA Instruments.

composition matrix [100]. A quadrant containing polymer compositions A3, A4, B3, B4 [406] has been outlined as containing the polymer compositions of the greatest resistance to water wash-off. FIG. 5 provides the same quadrant containing polymer compositions A3, A4, B3, B4 [406] as provided by the reactive surfactant composition matrix [100].

FIG. 6 provides test results providing the variation of the glass transition temperature of the final latex compositions based upon the weight content of BA to MAA. The Fox equation was used for modeling the relationship of the weight ratio of BA, with $T_g$, as shown in equation (1) below:

Fox Equation          Equation 1

$$\frac{1}{T_g} = \frac{w_1}{T_{g,1}} + \frac{w_2}{T_{g,2}}.$$

TABLE 9

Experimental Results and Physical Property Differences for Latex Compositions including the B4 Latex Composition

| Sample of Latex within Experimental Quadrant | Surfactant | Reactive surfactant, % | Viscosity, mPa · s 22.3° C. | Particle size (nm) | Particle size distribution | Solid content, % | pH | Tg, ° C. |
|---|---|---|---|---|---|---|---|---|
| A1 | 1596, 1616 | 2.5, 0.5 | 102 | 214 | 2.4 | 52 | 8.3 | 23.4 |
| A2 | 1596, 1616 | 2, 0.5 | 96 | 219 | 4.4 | 51 | 8.4 | 24.0 |
| A3 | 1596, 1616 | 1.5, 0.5 | 62 | 224 | 2.2 | 50 | 8.3 | 21.9 |
| A4 | 1596, 1616 | 1, 0.5 | 68 | 222 | 1.7 | 50 | 8.4 | 24.1 |
| B1 | 1596, 1616 | 2.5, 1.0 | 110 | 220 | 1.8 | 50 | 8.4 | 22.7 |
| B2 | 1596, 1616 | 2, 1.0 | 104 | 219 | 1.7 | 51 | 8.3 | 24.1 |
| B3 | 1596, 1616 | 1.5, 1.0 | 88 | 228 | 1.3 | 51 | 8.5 | 23.0 |
| B4 | 1596, 1616 | 1.0, 1.0 | 68 | 230 | 1.2 | 50 | 8.3 | 22.9 |
| C1 | 1596, 1616 | 2.5, 1.5 | 182 | 219 | 1.6 | 51 | 8.3 | 22.6 |
| C2 | 1596, 1616 | 2, 1.5 | 130 | 220 | 1.2 | 51 | 8.8 | 22.6 |
| C3 | 1596, 1616 | 1.5, 1.5 | 106 | 225 | 6 | 51 | 8.4 | 23.8 |
| C4 | 1596, 1616 | 1, 1.5 | 82 | 229 | 1.9 | 51 | 8.5 | 21.8 |
| D1 | 1596, 1616 | 2.5, 2.0 | 226 | 221 | 1.6 | 52 | 8.6 | 21.8 |
| D2 | 1596, 1616 | 2.0, 2.0 | 168 | 225 | 5.4 | 53 | 8.6 | 23.4 |
| D3 | 1596, 1616 | 1.5, 2.0 | 126 | 222 | 3.8 | 51 | 8.7 | 23.0 |
| D4 | 1596, 1616 | 1.0, 2.0 | 94 | 226 | 3.1 | 51 | 8.6 | 23.2 |

Figure 3:
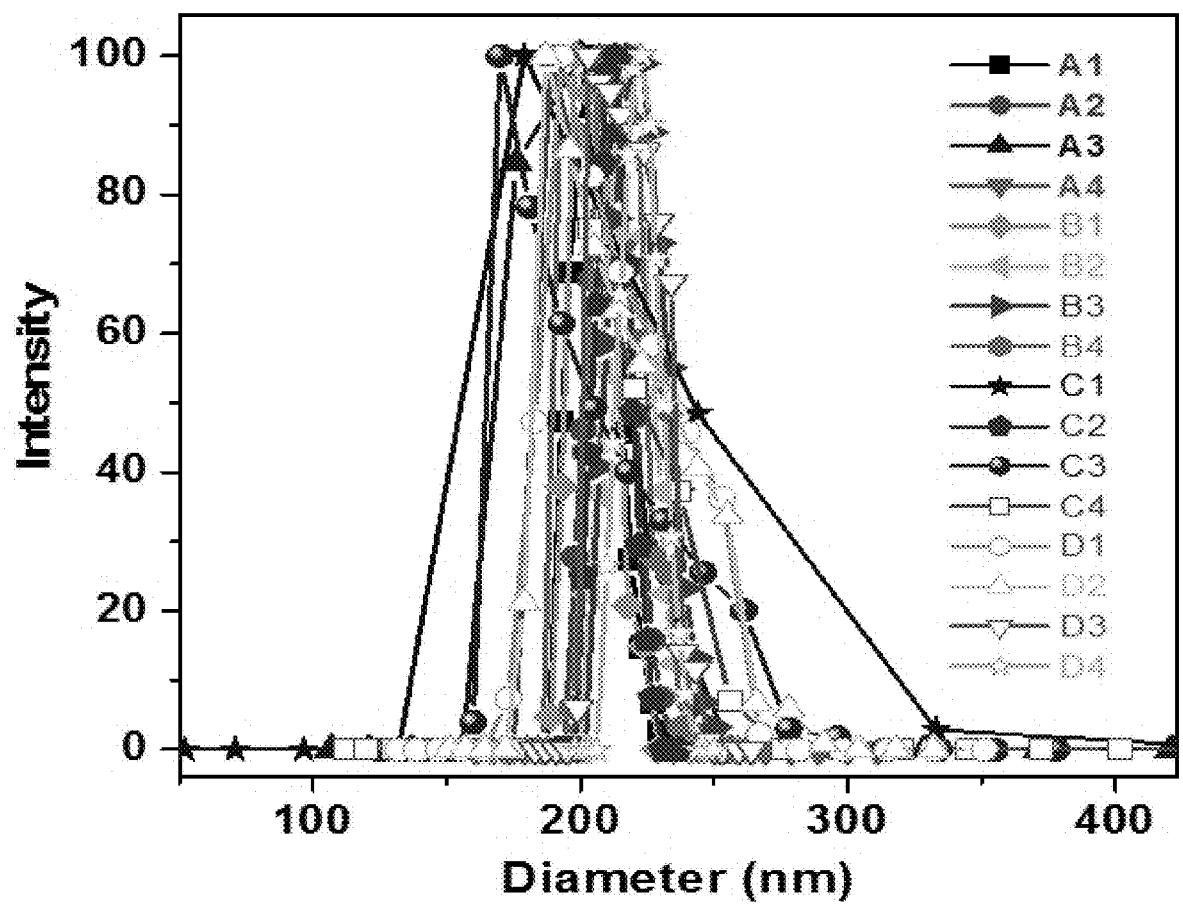
FIG. 3 shows the combined particle size distributions of all matrix quadrants.

Particle size distributions of latex composition for quadrants A, B, C, D are provided in Table 9. FIGS. 2A-2D provide graphical representations of the particle size distributions of each quadrant. Particle size distributions for quadrant A [202], containing latex compositions A1-A4, are provided in FIG. 2A. Particle size distributions for quadrant B [204], containing latex compositions B1-B4, are provided in FIG. 2B. Particle size distributions for quadrant C [206], containing latex compositions C1-C4, are provided in FIG. 2C. Particle size distributions for quadrant D [208], containing latex compositions D1-D4, are provided in FIG. 2D. Particle size distributions have been plotted by intensity versus diameter of the latex particle. A graphical display of all particle size distributions in the matrix are provided in FIG. 3.

Figure 4A:
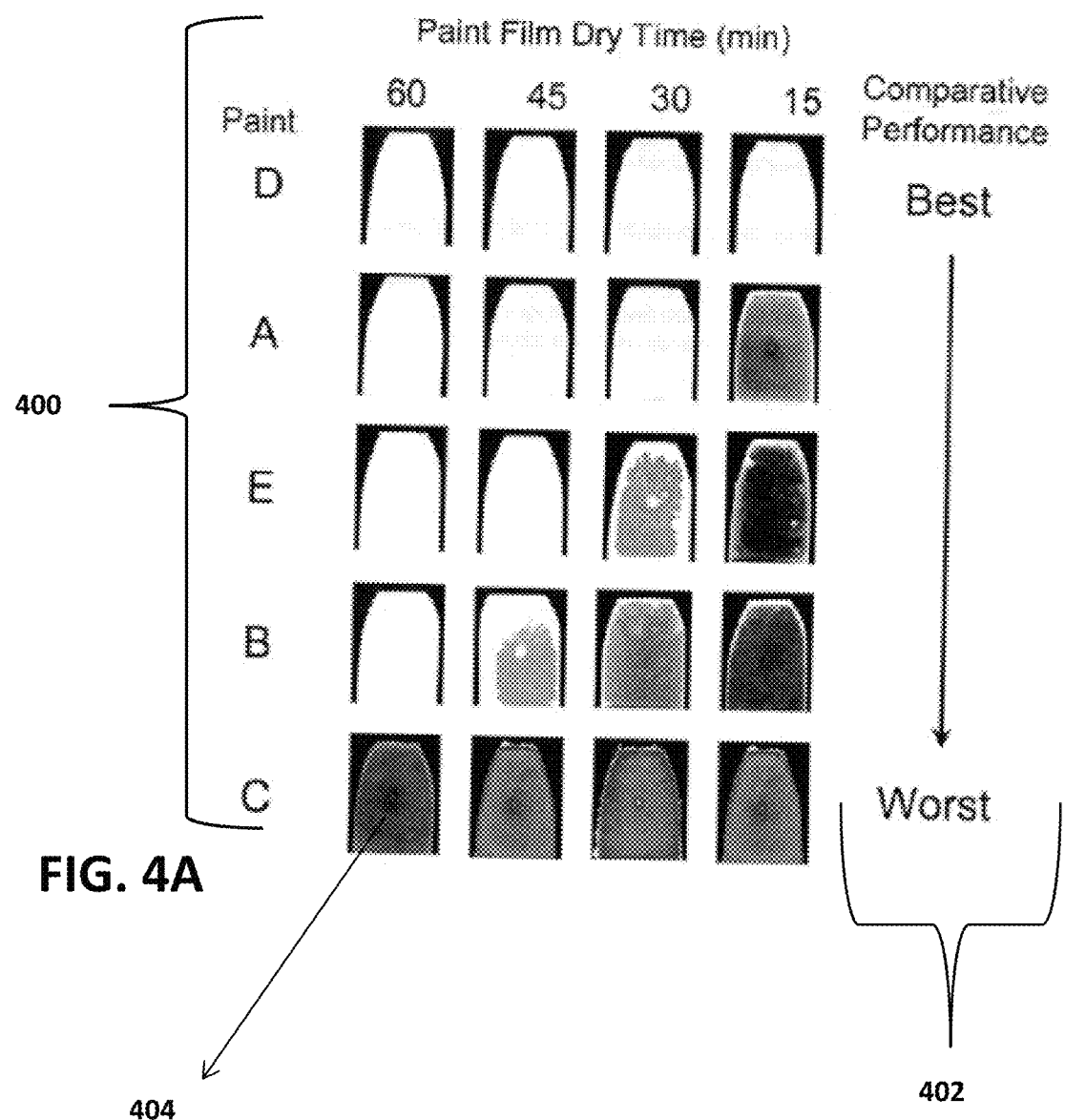
FIGS. 4A-4C shows the ASTM water wash-off resistance standards results matrix of the resulting polymer dispersions.
Figure 4B:
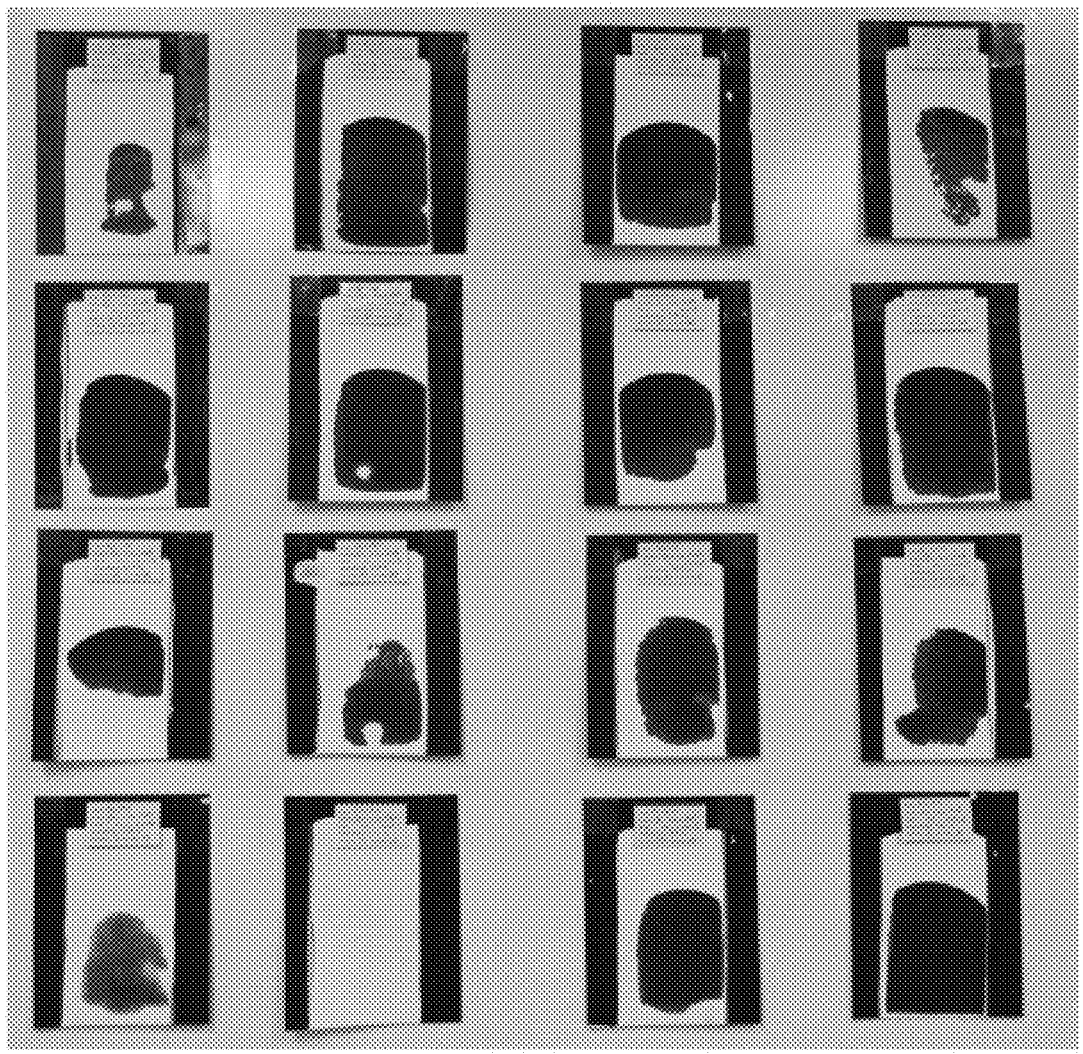
Figure 4C:
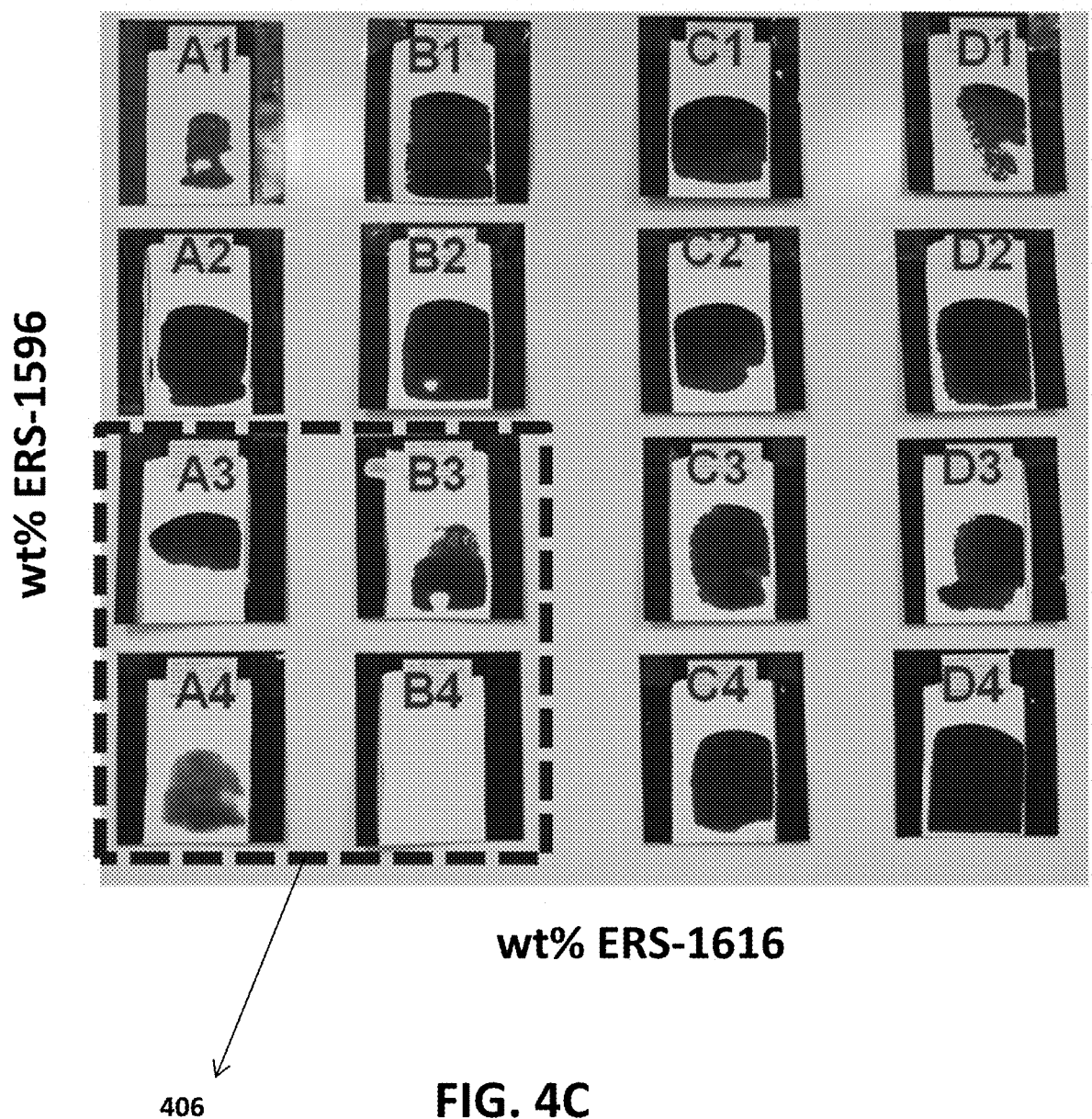

The ASTM D-7377 standards of rating water wash-off resistance [400] are provided in FIG. 4A. A comparative performance rating [402] is decided as "Best" or "Worst" based on the visual removal of paint from a substrate surface [404], or lack thereof. FIG. 4B provides a photographic record of the resulting novel latex compositions once tested for water wash-off resistance, while FIG. 4C provides the matrix of novel latex compositions as labeled to reflect the combinations of reactive surfactants as determined from the Where $w_1$ and $w_2$ are weight fractions of components 1 (BA) and 2 (MMA), respectively.

Tg,1 and Tg,2 represent glass transition temperatures of neat PBA and PMMA present in the final latex (B4) composition of the present invention.

Figure 7A:
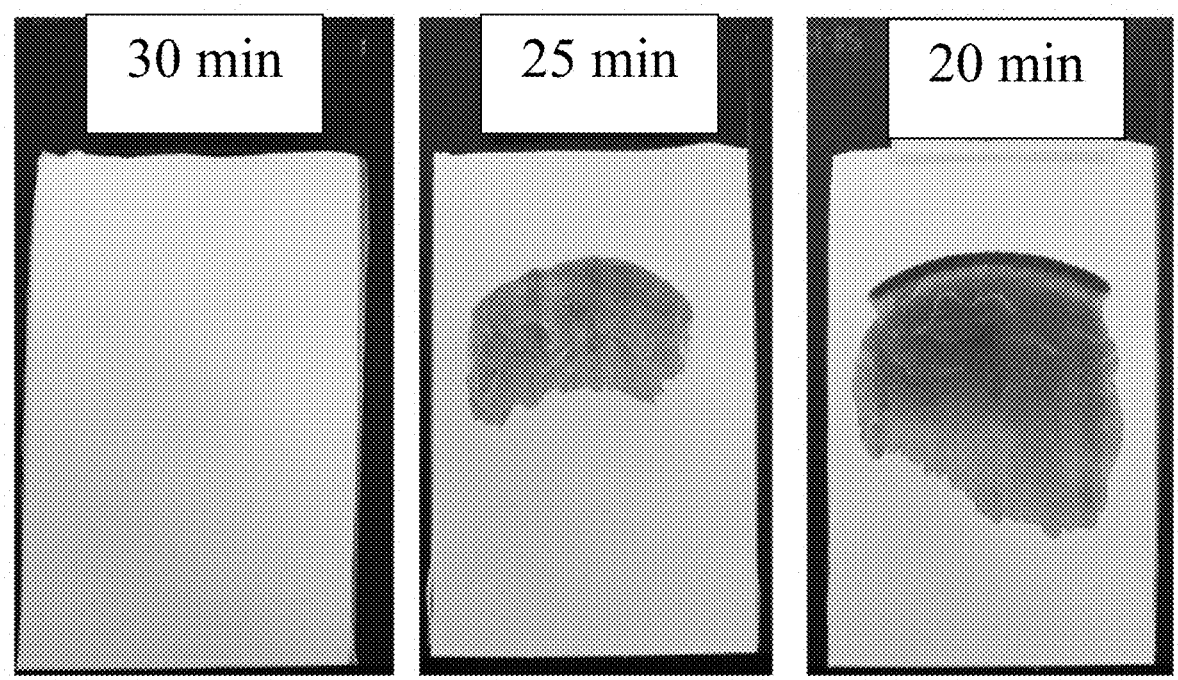
FIGS. 7A and 7B provide visible results obtained during water wash-off using ASTM D711 test methods with varying the BA weight percent content in the latex composition.
Figure 7B:
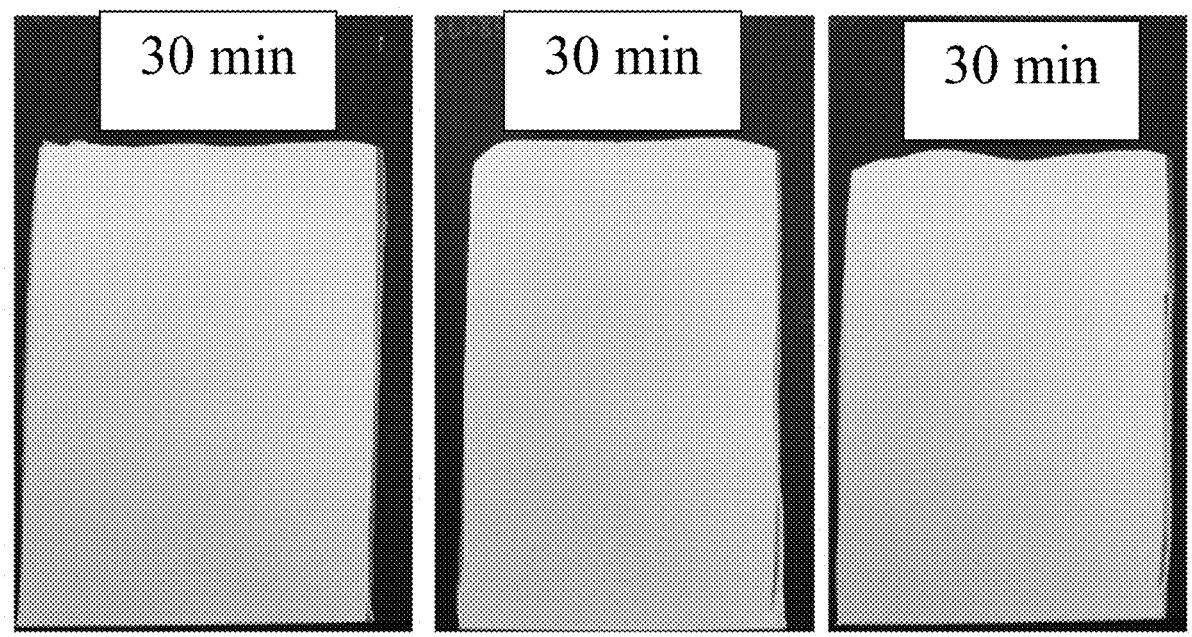

FIG. 7A depicts the water immersion test results using the ASTM D7377, using an ASTM D711 modification. The test method was applied for the B4 latex composition and resulting compositions developed using variations in the BA to MAA weight content. A water immersion test was employed at drying time intervals of 20 min, 25 min, and 30 min. The air temperature of the tests was recorded from 73° C.-74° C. with a relative humidity reading of 52%-54%. Drawdown cards for 20 min and 25 min were both recorded as a "fail", with a "pass" recorded for the 30 min dry-time sample. FIG. 7B provides repeated test results for the 30 min dry-time sample, all resulting in a visual "pass" result.

Test Methodology

Durability of traffic paint on pavement surfaces, so as not to be removed by rain, is a necessity for driver safety.

Early water wash-off resistance in traffic paint compositions was evaluated for the resulting traffic paint compositions using ASTM D 7377. The "effective water wash-off dry time (n)" is defined for the standard designation as the traffic paint dry time required for no visible loss of coating when conducting the wash-off Standard Practice.

As stated in Section 4.1 of ASTM-7377, a series of uniform thickness films of traffic paint were prepared on standard substrates. Drying of the preparations was allowed over different time periods. Each paint film is then tested to determine the relative amount of coating remaining at the end of the wash off period.

Water Wash-Off Testing

The water wash-off procedure generally follows ASTM D7377-08 and is modified by using section 4.6.2 of ASTM D711-10 for controlled air flow. Paint viscosity is determined by measuring Krebs Units (KU) using a paddle type viscometer. Viscosities of 80 to 90 KU are considered suitable for testing.

Drawdown cards are prepared for paint sample testing through wet film formation. In order to prepare a drawdown card, sample of paint is drawn to 15 mil (0.38 mm) wet film thickness onto to a clean black scrub test panel and allowed to dry horizontally for 15 to 60 minutes in a conditioned room at 23° C.±2° C. and 50% to 55% relative humidity under a constant 2 mph air flow. When the drying time is complete, the samples are placed under a stream of 25° C. tap water flowing at a rate of 1.5 gal/min and allowed to remain there for 5 minutes during which the time of film break through is recorded. After completion of the test, the samples are then removed from the flowing water and observed and evaluated noting the percentage of wash off and any other effects of damage.

Dry Time Testing

Dry time testing is done according to ASTM D711-10. Paint films of 15 mil wet film thickness are made on a plastic sealed paper chart. The samples are dried at 23° C.±2° C. and 50+5% relative humidity while lying horizontally and under a 3 mph air flow. The film is allowed to dry for 5 to 16 minutes, at which point a weighted steel cylinder with O-rings is rolled across the film. The paint film is considered to pass when no paint clings to the rings.

Water Immersion Testing

Water immersion testing is based upon ASTM D870-09. A drawdown is made onto clean glass or a black scrub test panel at 15 mil wet film thickness and is allowed to dry for a specified time, from 15 to 90 minutes, lying horizontally under controlled atmospheric conditions, 50±5% relative humidity, and 23° C. 2° C. Once the drying time is complete, the sample is placed vertically and half immersed into a tub of standing, room temperature tap water for a prescribed time period. The samples are observed during the immersion to note the effects of damage to the paint sample provided on the drawdown card. When the specified time of immersion is complete, the sample is removed and allowed to dry. The sample is evaluated between 5 to 10 minutes of its removal from the water and again once the film is dry.

TABLE 10

Data Obtained During ASTM D 7377 - Water Wash-Off Resistance Testing Conditions for the Latex Compositions Pictured in FIG. 4B Illustrating A Single "Pass" Result for the B4 Composition

| Latex | Dry Time (min) | Air Flow (mph) | Break | Air Temp. (F.) | Humidity |
|---|---|---|---|---|---|
| A1 | 30 | 2 | 2 m 42 s | 74 | 45 |
| A2 | 30 | 2 | 12 s | 75 | 43 |
| A3 | 30 | 2 | 12 s | 75 | 45 |
| A4 | 30 | 2 | 48 s | 74 | 49 |
| B1 | 30 | 2 | 24 s | 75 | 46 |
| B2 | 30 | 2 | 10 s | 74 | 48 |
| B3 | 30 | 2 | 21 s | 74 | 49 |
| B4 | 30 | 2 | 0 | 76 | 45 |
| C1 | 30 | 2 | 6 s | 74 | 61 |
| C2 | 30 | 2 | 6 s | 75 | 46 |
| C3 | 30 | 2 | 14 s | 73 | 48 |
| C4 | 30 | 2 | 9 s | 75 | 49 |
| D1 | 30 | 2 | 56 s | 75 | 46 |
| D2 | 30 | 2 | 7 s | 73 | 48 |
| D3 | 30 | 2 | 19 s | 76 | 45 |
| D4 | 30 | 2 | 6 s | 75 | 49 |

Section 8.5 of the ASTM D 7377 standard provides a method for determining if a film is considered washout resistant when no paint is visibly washed down from the test area. Alternatively, washout failure can be rated by the amount of paint washed down from the test area. A black substrate, as used for wash-off testing in the present disclosure, is useful for visual rating of the wash-off failure. Visual results of the water wash-off testing can be seen in FIGS. 4B and 4C.

The content of all references cited in the instant specifications and all cited references in each of those references are incorporated in their entirety by reference herein as if those references were denoted in the text.

While the many embodiments of the invention have been disclosed above and include present embodiments, many other embodiments and variations are possible within the scope of the present disclosure and in the appended claims that follow. Accordingly, the details of the embodiments and examples provided are not to be construed as limiting. It is to be understood that the terms used herein are merely descriptive rather than limiting and that various changes and numerous equivalents may be made without departing from the spirit or scope of the invention as claimed.

We claim:

1. A latex formulation formed from a reaction mixture comprising:

at least one ethylenically unsaturated monomer, wherein the ethylenically unsaturated monomers comprise butyl acrylate and methyl methacrylate, and wherein butyl acrylate is present in a weight fraction of at least 0.45 based on the total amount of butyl acrylate and methyl methacrylate;

a reactive surfactant selected from the group consisting of
a compound of formula (I)

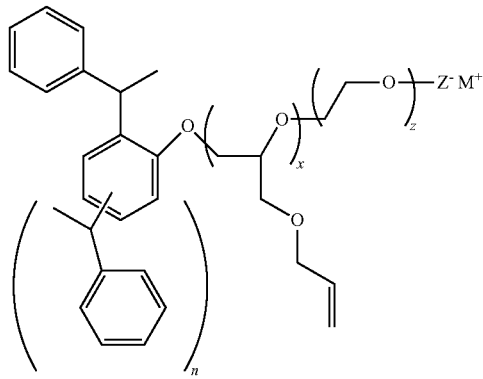

where n is 1 or 2; x is 1-10; z is from about 5 to 60; $Z^-$ is $SO_3^-$ or $PO_3^{2-}$; and $M^+$ is $Na^+$, $K^+$, $NH_4^+$, or an alkanolamine;
a compound of formula (II)

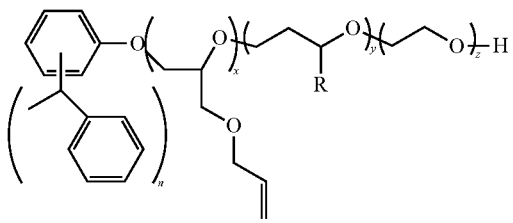

where n is 1 or 2; x is 1-10; y is 0, 1, or 2; R is —H, -alkyl, or -alkylphenol; z is from about 5 to 60; and
a compound of formula (III)

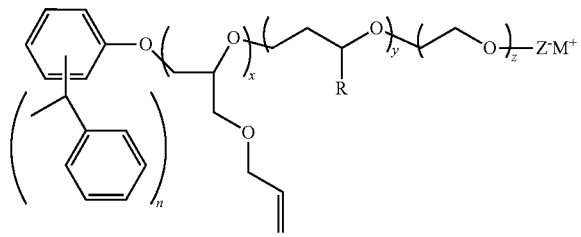

where n is 1 or 2; x is 1-10; y is 0, 1, or 2; R is —H, -alkyl, or -alkylphenol; z is from about 5 to 60; $M^+$ is $SO_3^-$ or $PO_3^{2-}$; and $M^+$ is $Na^+$, $K^+$, $NH_4^+$, or an alkanolamine;
and wherein the latex formulation has a number-average particle size of 230 nm, and a particle size distribution of 1.2 as determined by dynamic light scattering.

2. The latex formulation of claim 1, further comprising a pigment.

3. A method of making a latex formulation, comprising the steps of:
providing a seed composition comprising a reactive surfactant, and a redox initiator system, and at least one ethylenically unsaturated monomer wherein the ethylenically unsaturated monomers comprise butyl acrylate and methyl methacrylate, and wherein butyl acrylate is present in a weight fraction of at least 0.45 based on the total amount of butyl acrylate and methyl methacrylate,
heating the seed composition to 85° C.;
adding to the heated seed composition a pre-emulsion composition comprising a second redox initiator system, and a reactive surfactant selected from the group consisting of:
a compound of formula (I)

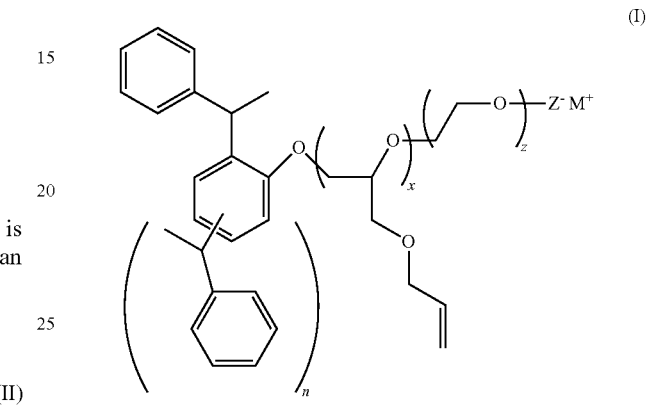

where n is 1 or 2; x is 1-10; z is from about 5 to 60; $Z^-$ is $SO_3^-$ or $PO_3^{2-}$; and $M^+$ is $Na^+$, $K^+$, $NH_4^+$, or an alkanolamine;
and
a compound of formula (II)

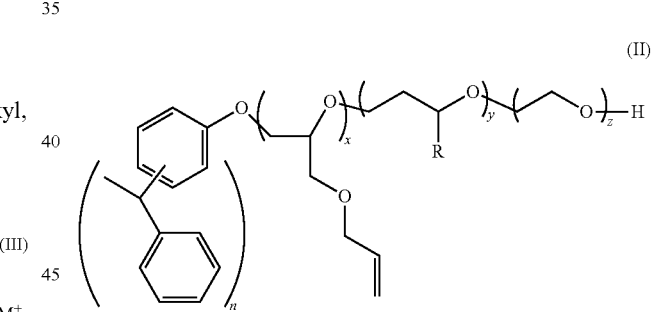

where n is 1 or 2; x is 1-10; y is 0, 1, or 2; R is —H, -alkyl, or -alkylphenol; z is from about 5 to 60; and
a compound of formula (III)

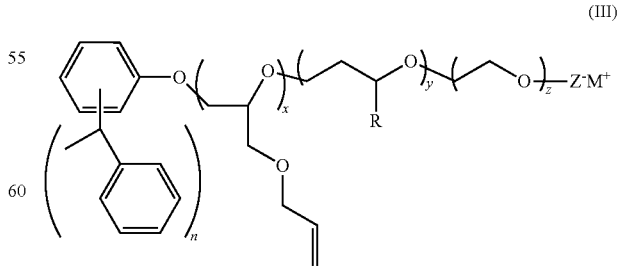

where n is 1 or 2; x is 2; y is 0, 1, or 2; z is from about 5 to 60; is $SO_3^-$ or $PO_3^{2-}$; and $M^+$ is $Na^+$, $K^+$, $NH_4^-$, or an alkanolamine; and heating the combined seed composition and emulsion composition to 85° C. to provide a latex formulation, wherein the latex formulation has a number-average particle size of 230 nm and a particle size distribution of 1.2, as determined by dynamic light scattering.

4. The latex formulation of claim 2, wherein the pigment comprises a titanium dioxide pigment.

5. The method of claim 3 wherein the latex formulation has a viscosity of 68 mPaS at 22.3° C.

6. The method of claim 3, wherein the latex formulation has a $T_g$ of greater than or equal to 20° C.

7. The method of claim 3, wherein the reactive surfactant is present in the latex formulation in an amount between 0.5 wt % to 1.5 wt %, based on the total weight of the latex formulation.

8. The method of claim 3, wherein at least two different reactive surfactants are present in the latex formulation.

9. The method of claim 3, wherein the at least two different reactive surfactants are present in the latex formulation in a total amount of 1.5 wt % to 5.0 wt %.

10. The method of claim 3, wherein the latex formulation further comprises a pigment.

11. The method of claim 10, wherein the pigment comprises titanium dioxide.

12. The latex formulation of claim 1, wherein the latex formulation has a viscosity of 62-226 mPaS at 22.3° C.

13. The latex formulation of claim 1, wherein at least two different reactive surfactants are present in the latex formulation.

14. The latex formulation of claim 1, wherein the at least two different reactive surfactants are present in the latex formulation in a total amount of 1.5 wt % to 5.0 wt %.

15. The latex formulation of claim 1, wherein the latex formulation has a $T_g$ of greater than or equal to 20° C.

16. A traffic paint composition, comprising the reaction products of
ethylenically unsaturated monomers comprising butyl acrylate and methyl methacrylate, and wherein butyl acrylate is present in a weight fraction of at least 0.45 based on the total amount of butyl acrylate and methyl methacrylate;
one or more reactive surfactants; and
a redox initiator,
wherein the traffic paint composition has a viscosity of 62-226 mPaS at 22.3° C., a total solids content of about 50 weight percent, a pH of 8.3 to 8.7; and a number-average particle size of 230 nm and a particle size distribution of 1.2, as determined by dynamic light scattering;
and wherein the traffic paint composition passes ASTM-7377 test of water wash-off resistance.

17. The latex formulation of claim 1, where the latex formulation has a total solids content of about 50 weight percent.

18. The latex formulation of claim 1, where the latex formulation has a pH of 8.3 to 8.7.

19. The latex formulation of claim 1, wherein
the compound of formula (I) has x is 1; z is 16; $Z^-$ is $SO_3^-$; and $M^+$ is $NH_4^+$,
the compound of formula (II) has x is 1; and z is 16;
the compound of formula (III) has x is 2; and z is 15.

* * * * *